(12) United States Patent
Kamikihara et al.

(10) Patent No.: US 6,344,088 B1
(45) Date of Patent: Feb. 5, 2002

(54) STRIPE COATING APPLICATOR AND METHOD

(75) Inventors: Nobuyuki Kamikihara, Osaka; Masaru Watanabe, Nishinomiya, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/459,106

(22) Filed: Dec. 13, 1999

(30) Foreign Application Priority Data

Dec. 16, 1998 (JP) .............................. 10-357683

(51) Int. Cl.[7] .......................... B05C 3/02; B05C 11/00; B29C 47/12; B29C 47/92
(52) U.S. Cl. ..................... 118/712; 118/413; 118/411; 425/141; 425/463; 425/466
(58) Field of Search .................. 118/211, 213, 118/216, 221, 222, 225, 669, 677, 679, 680, 410, 419, 712, 411, 412, 413; 425/464, 465, 466, 91, 92, 141, 381, 463; 239/451, 455, 456, 563, 564, 589; 427/286, 8, 9

(56) References Cited

U.S. PATENT DOCUMENTS 4,990,078 A  *  2/1991  Tomita ....................... 425/141

FOREIGN PATENT DOCUMENTS

JP         7-195015       8/1995
JP         9-271705      10/1997

* cited by examiner

Primary Examiner—Richard Crispino
Assistant Examiner—Kevin P. Shortsle
(74) Attorney, Agent, or Firm—Smith, Gambrell & Russell, LLP

(57) ABSTRACT

A stripe coating applicator for coating at least two stripes having a plurality of slit outlets provided at a nozzle edge and a pair of block edges forming said slit outlets. Stripe partitions partition and define the plurality of slit outlets formed at the pair of block edges. Notches are formed on at least one of said block edges toward a direction of the coating fluid to be discharged and correspond to the positions of the stripe partitions. Movable parts are formed at the at least one of said block edges where the notches are provided. The notches and thin parts form the movable parts. A slit gap adjustment means is provided for adjusting slit gaps by moving the movable parts.

11 Claims, 21 Drawing Sheets

Fig. 5 (a) Prior Art
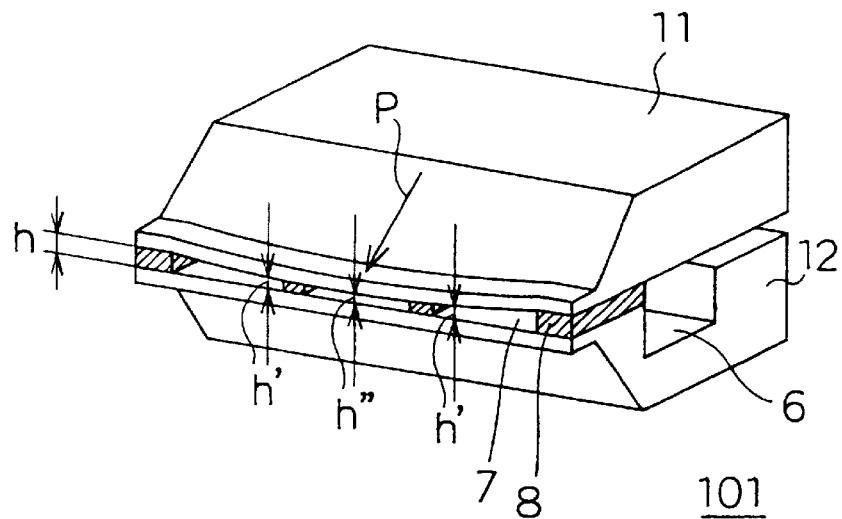
Fig. 5 (b) Prior Art
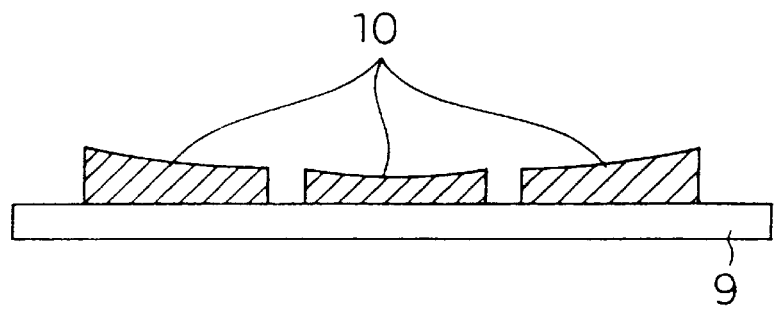
Fig. 5 (c) Prior Art
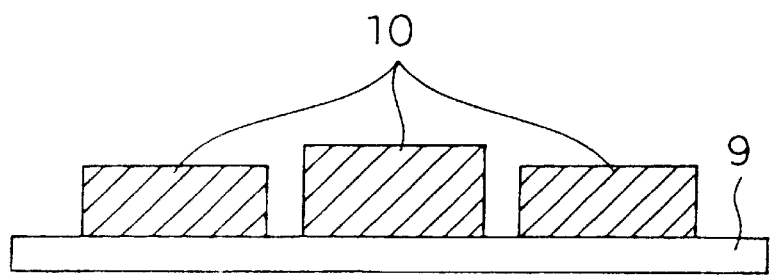

Fig. 10 (a) PRIOR ART
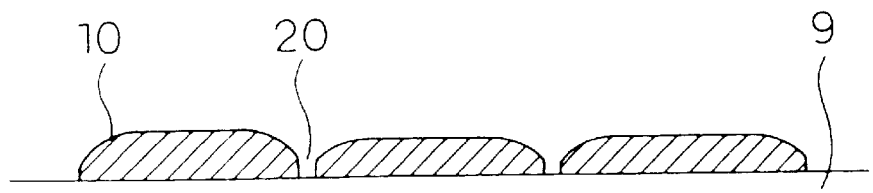
Fig. 10 (b)
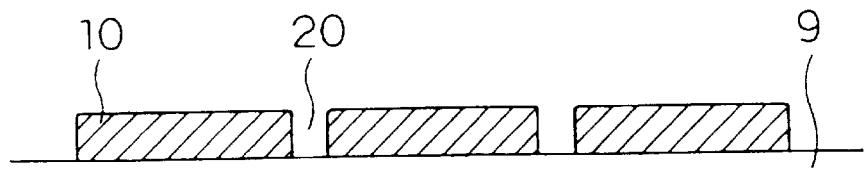
Fig. 10 (c) PRIOR ART
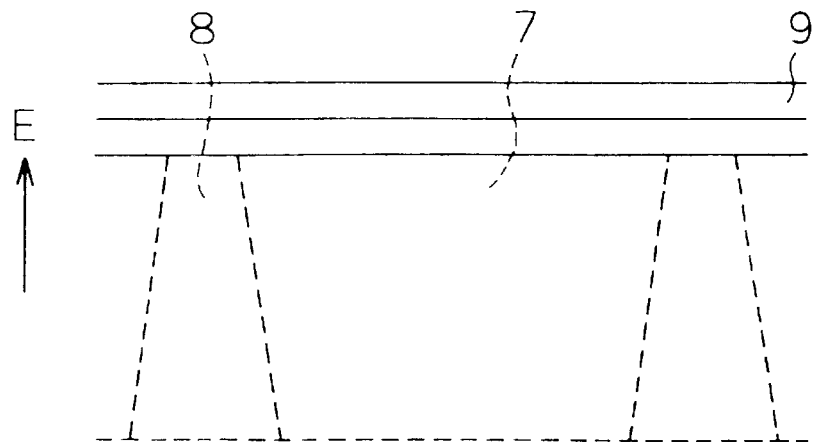

STRIPE COATING APPLICATOR AND METHOD

BACKGROUND OF THE INVENTION

1. Field of the Invention

The present invention relates to a coating applicator and method for applying coating material in stripes on one side or both sides of a base continuously running.

2. Related Art of the Invention

As for a coating applicator for applying coating fluid on the surface of a base running continuously, an extrusion type coating applicator is known, which comprises a manifold for spreading coating fluid in the direction of the coating width and a slit for commutating and discharging coating fluid supplied to the manifold.

As for a method for applying the coating film in stripes by the extrusion type coating applicator, there is a method for discharging the coating fluid while splitting the flow of it within a slit by providing (a) partition(s) in the slit.

In addition, the method using the partition(s) adapts the following method for uniforming the film thickness in the direction of coating width. Namely, in a T-shape die for extruding a resin film or sheet, a lip edge of a nozzle is transformed by pushing or pulling a differential screw or a heat bolt or by pushing into with an air pressure drive or the like, so that the discharge amount is finely adjusted to uniform the film thickness in the direction of the width. Or the nozzle is partially heated by a heater provided within the nozzle, which changes the flow property of the resin to be applied by changing the temperature of it so that the film is uniformed in thickness in the direction of the width.

Moreover, in the Japanese publication of unexamined patent application H9('97)-271705, a method is disclosed in a coating applicator forming a coating film of photo-resister fluid or the like on a semiconductor wafer or a glass substrate, wherein the lip edge of a nozzle is transformed by a piezo-actuator to finely adjust the discharge amount so that the film thickness is uniformed in the direction of the coating width of the coating film.

In case of the coating application in stripes, it is important to uniform the discharge amount in the direction of the coating width at the slit outlets for each of the stripes of coating fluid in order to uniform the coating amount in the direction of the coating width for each stripe.

In the above mentioned T-shape die or other coating applicators, however, in case of applying over the entire width, it is easy to uniform the discharge amount in the direction of the coating width by transforming the lip edge of the nozzle as well as by adjusting transformation of the peripheral part of that portion at the same time. In case of the coating application in stripes, however, because it is important for the film thickness of the coating for each stripe to be uniformed, it is necessary to uniform the discharge amount for each stripe. If the periphery of the portion transformed at the lip edge of the nozzle is also transformed, however, it is not easy to control the inconsistency of the film thickness of the coating for each stripe.

SUMMARY OF THE INVENTION

It is the purpose of the present invention to solve the above mentioned problem of the coating applicator according to the prior art, and to provide a stripe coating applicator and method for uniforming the film thickness in the direction of the coating width of the coating fluid even in case of the stripe application.

According to the first aspect of the present invention (corresponding to Claim 1), the applicator for coating at least two stripes comprises;
- a plurality of slit outlets provided at a nozzle edge;
- an upper and a lower pair of block edges forming said slit outlets;
- stripe partitions partitioning a plurality of said slit outlets;
- notches formed on at least either one of said block edges toward the direction of coating fluid being discharged, said formation of said notches being corresponding to positions of said stripe partitions;
- movable parts formed by said notches and thin parts at said block edge(s) where said notches are provided; and
- slit gap adjustment means for adjusting slit gaps by moving said movable parts.

Also, according to the second aspect of the present invention (corresponding to Claim 9), the applicator for applying at least two stripes, comprises a nozzle having slit gap adjustment means for adjusting slit gaps by moving movable parts formed at either edge of an upper and lower pair of blocks forming slit outlets, by thin parts, wherein;
- displacement sensors measure displacement of said movable parts; and
- said slit gap adjustment means performs a feedback control based on numeric values outputted from said displacement sensors.

Furthermore, according to the third aspect of the present invention (corresponding to Claim 12), a slit gap adjustment method for adjusting a slit gap in a stripe coating applicator according to the applicator of the present invention, is such that
- a relationship between an adjustment amount for coating film and a movement of said movable part is prepared in advance;
- a thickness of the coating film after application is detected;
- a thickness adjustment amount is calculated from the thickness and, based on said relationship, an amount of said movement of the movable part is calculated; and
- based on the movement of the movable part, said movable part is moved by said slit gap adjustment means.

BRIEF DESCRIPTION OF THE DRAWINGS

FIG. 5(a) is a perspective view of a nozzle edge when transformed in a stripe coating applicator according to a prior art;

FIG. 5(b) is a cross section view of a stripe coating film through a nozzle edge after transformation in a stripe coating applicator according to a prior art;

FIG. 5(c) is a cross section view of a stripe coating film through a nozzle edge before transformation in a stripe coating applicator according to a prior art;

FIG. 10(a) is a cross section view of a stripe coating film by a stripe coating applicator according to a prior art;

FIG. 10(b) is a cross section view of a stripe coating film by a stripe coating applicator of the embodiment 2 according to the present invention;

FIG. 10(c) is an enlarged plan view showing a stripe partition in a stripe coating applicator according to a prior art;

Figure 1:
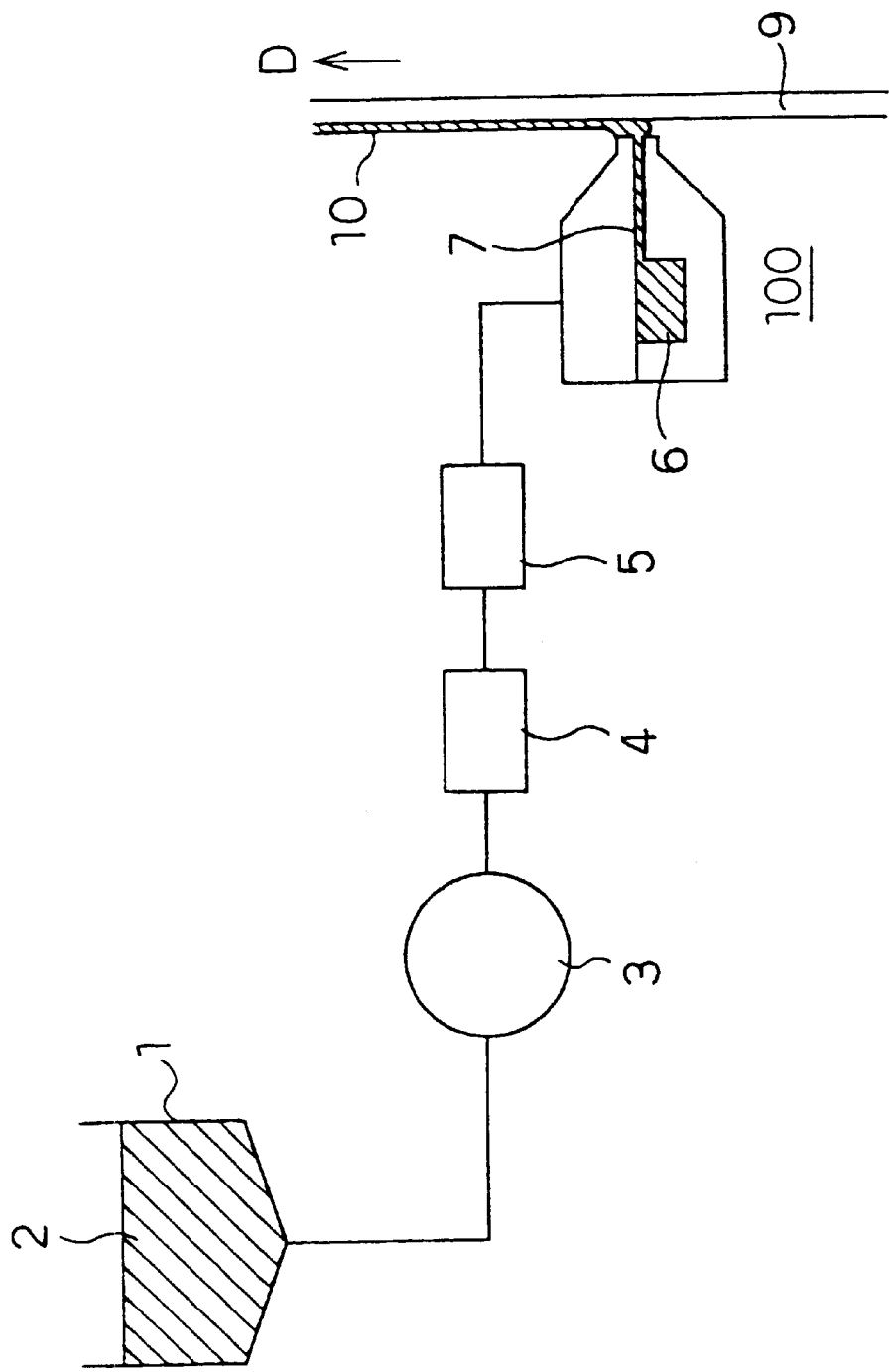
FIG. 1 is a schematic view of a coating process in a coating applicator of the embodiment according to the present invention.

Description of the Numerals 1 stock tank
2 coating fluid
3 supplying pump
4 filter
5 flow meter
6 manifold
7 slit
8 stripe partition
9 base
10 stripe coating
11 upper block
12 lower block
13L,13R side blocks
14 coating fluid supplying pipe
15 slit gap adjustment means
16 slit gap adjustment means fixed part
17 notch
18 movable part
19 thin part
20 uncoated stripe
21 lip
22 stripe control member
31 displacement sensor
32 displacement sensor movable part
33 zero point adjustment means
34 zero point adjustment means fixed part
35 slit gap adjustment means controller
36 feedback controller
37 amplifier
38 film thickness gauge
100 nozzle
101 nozzle without notches
102 nozzle without stripe control members

PREFERRED EMBODIMENTS OF THE PRESENT INVENTION

Referring to the drawings, embodiments for carrying out the invention are described in the following.

Embodiment 1

Referring to FIGS. 1–7, the first embodiment for carrying the present invention is described.

Figure 7:
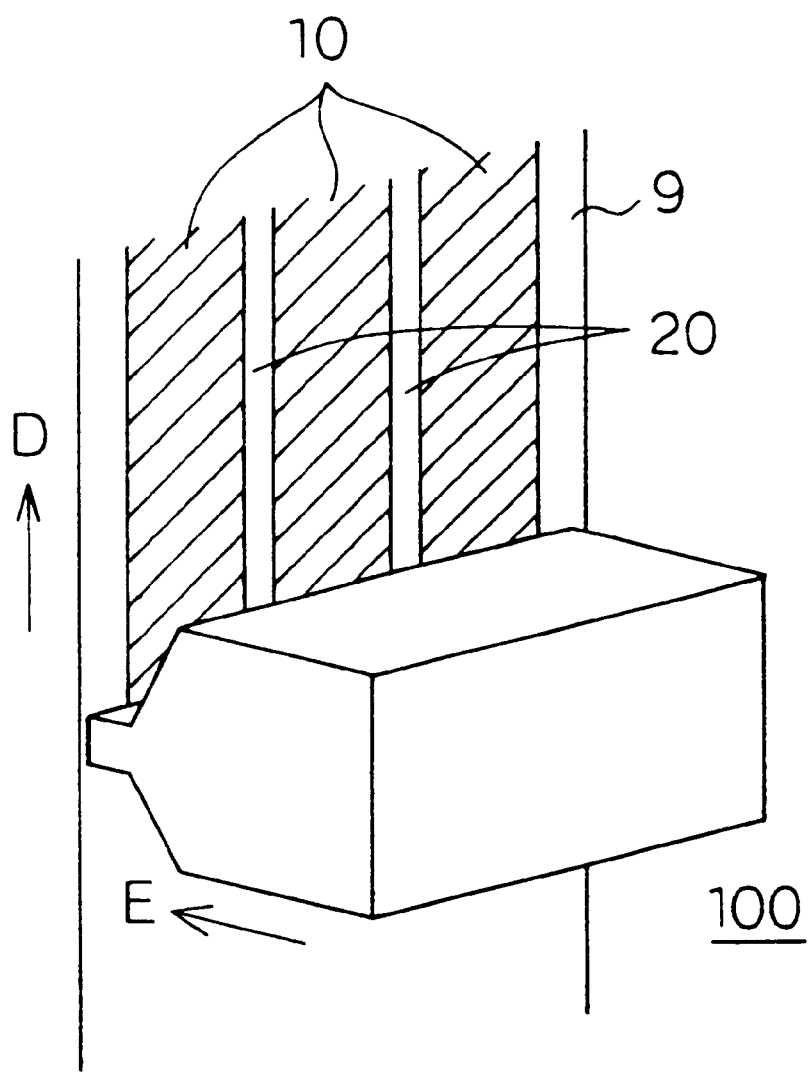
FIG. 7 is a schematic view of a coating application by a stripe coating applicator of the embodiment according to the present invention.

First of all, the structure of the coating applicator according to the present invention is described together with its operation which is a method according to the present invention FIG. 1 illustrates a schematic view of a stripe coating process utilizing a nozzle 100 according to the present As shown in FIG. 1, coating fluid 2 in a stock tank 1 is fed by supplying pump 3 which is able to feed fluid steadily such as a metering pump. In addition, the coating fluid 2 is measured in its flow by a flow meter 5 after aggregates or foreign particles in the coating fluid 2 are removed by a filter 4, and then is sent to a nozzle 100. After that, the coating fluid 2 is pushed out of a manifold 6 to a slit 7, the flow of which is divided by stripe partitions 8 shown in FIG. 2, is discharged from the outlets of the slit 7 to be coated in stripes on the surface of a base 9 continuously running in the direction of arrow D so that a stripe coating film 10 is formed as shown in FIG. 7.

The structure of the nozzle 100 according to the present invention is described next.

Figure 2:
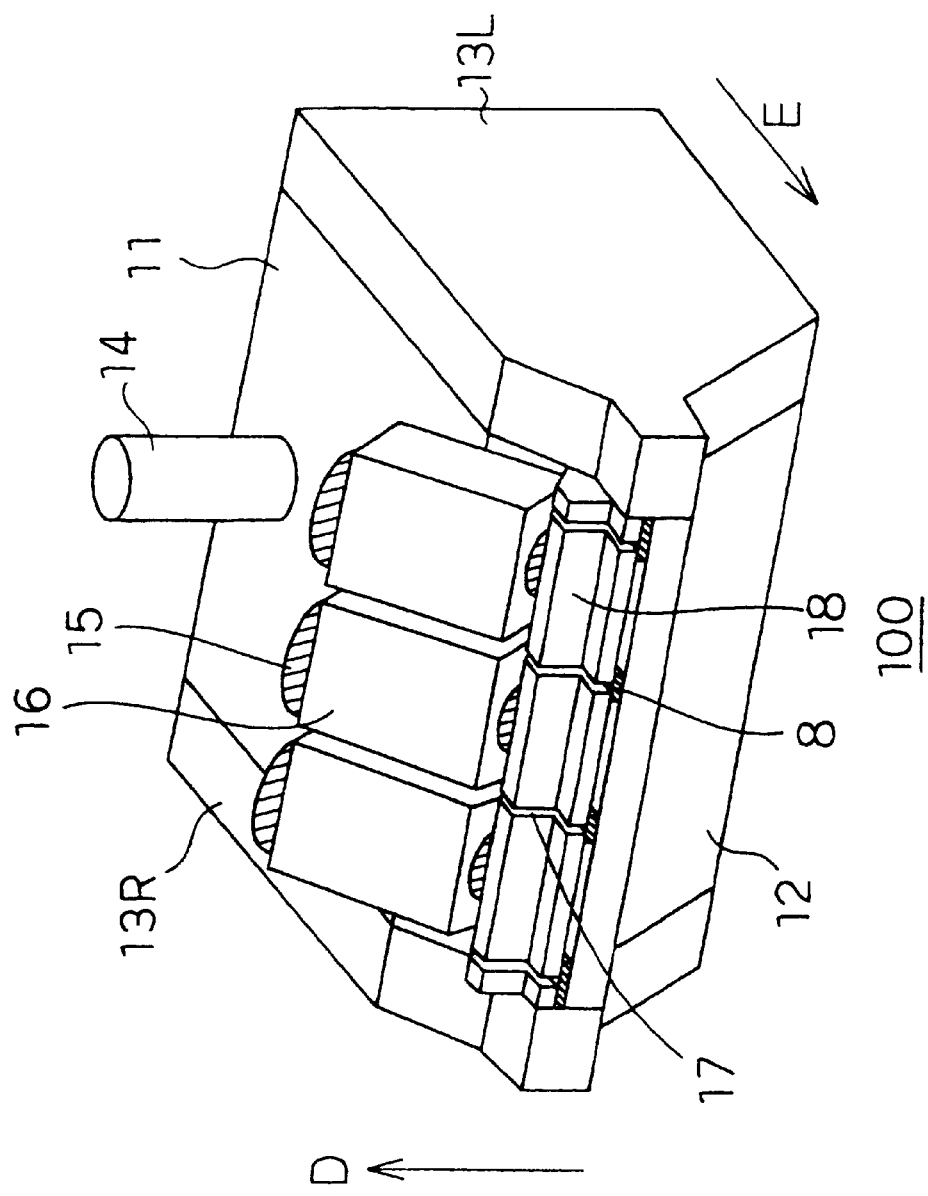
FIG. 2 is a perspective view of a nozzle of the embodiment according to the present invention.
Figure 3:
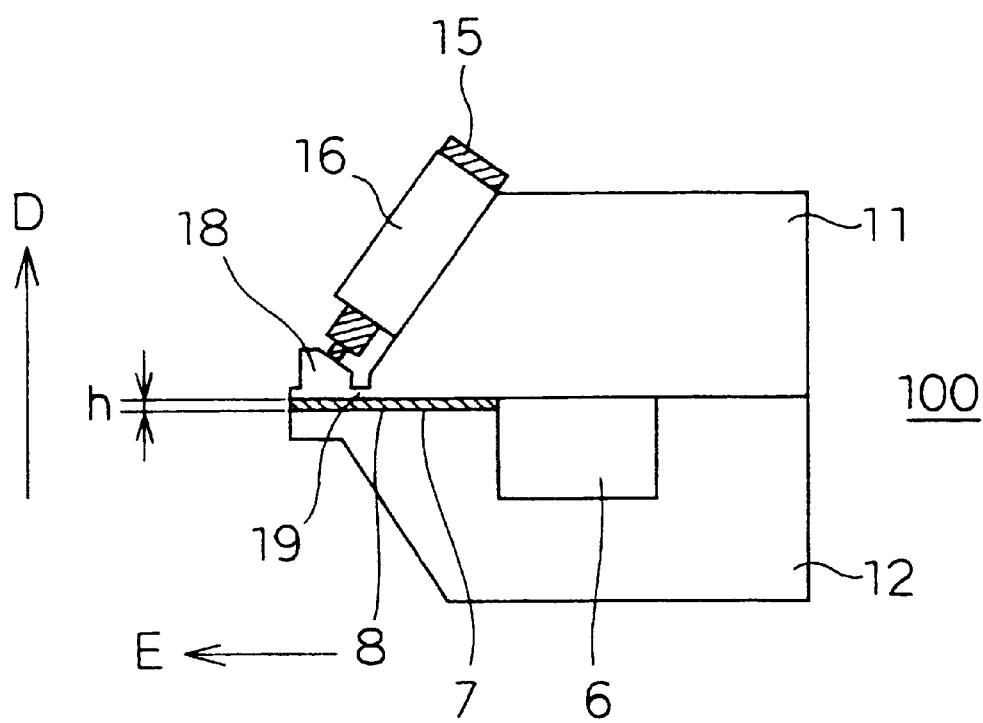
FIG. 3 is a cross section view of a nozzle of the embodiment according to the present invention.

FIG. 2 is a perspective view of the nozzle 100 according to the present invention. And FIG. 3 is a cross section of the nozzle 100 according to the present invention. As shown in FIG. 2, the nozzle 100 comprises an upper block 11, a lower block 12 and two side blocks 13L and 13R. Those blocks 11, 12, 13L and 13R are connected to each other with screws (not shown).

A pipe 14 for supplying the coating fluid 2 is connected to the upper block 11. With the lower block 12, the stripe partitions 8 are provided for dividing the flow of the coating fluid 2 supplied to a manifold 6 and for discharging it from the outlets of the slit 7. The manifold 6 and the slit 7 are processed into shapes so that they are formed by combining the lower block 12 with the upper block 11 as shown in FIG. 3. In the present invention, the gap h between the upper block 11 and the lower block 12 is called a slit gap.

On top of the upper block 11, slit gap adjustment means 15 (for example, piezo-actuators, differential screws, heat bolts, air pressure drives, etc.) for adjusting each part of the slit gap, and slit gap adjustment means fixed parts 16 for fixing the slit gap adjustment means 15 on top of the upper block 11 are attached with screws (not shown).

At the end of the upper block 11, movable parts 18 and thin parts 19 are configured. Each of those movable parts 18 is displaced in the direction of narrowing or broadening the corresponding part of the slit gap in accordance with the pushing strength of the slit gap adjustment means 15. Each of the thin parts 19 functions as a fulcrum for the corresponding movable part 18 to be bent. As shown in FIG. 2, notches 17 are provided on both sides of each of the movable parts 18 in the direction E of the coating fluid being discharged.

Though, in the present embodiment 1, a three stripe coating is described with respect to four notches 17, the present invention is applied for all the cases where more than one stripe are coated where the number of notches 17 is always the number of stripes plus one.

The first feature of the present embodiment is described next.

Figure 4:
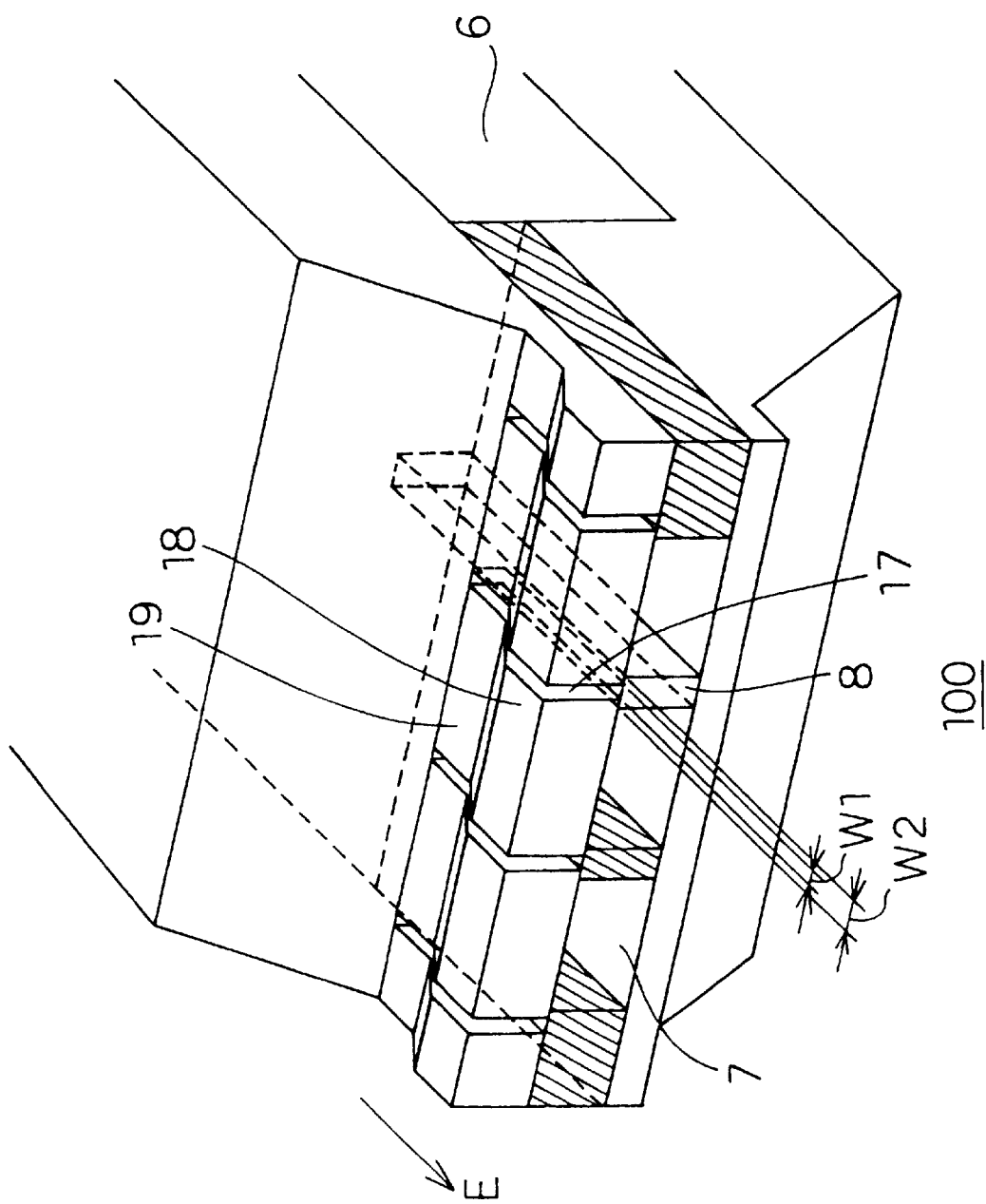
FIG. 4 is a perspective view of a nozzle edge of the embodiment according to the present invention.
Figure 6:
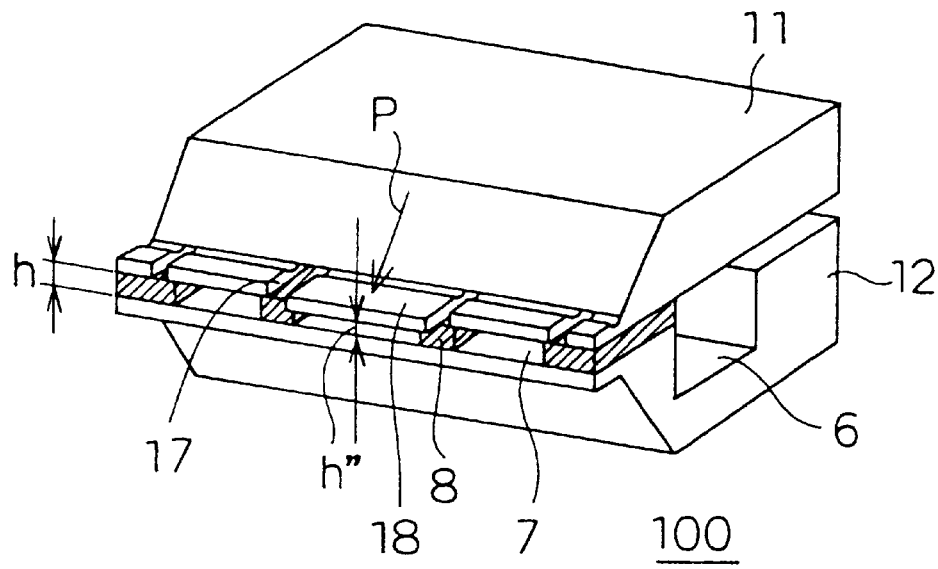
FIG. 6(a) is a perspective view of a nozzle edge when transformed in a stripe coating applicator of the embodiment according to the present invention.
FIG. 6(b) is a cross section view of a stripe coating film through a nozzle edge after transformation in a stripe coating applicator of the embodiment according to the present invention.
FIG. 6(c) is a cross section view of a stripe coating film through a nozzle edge before transformation in a stripe coating applicator of the embodiment according to the present invention.
Figure 6:
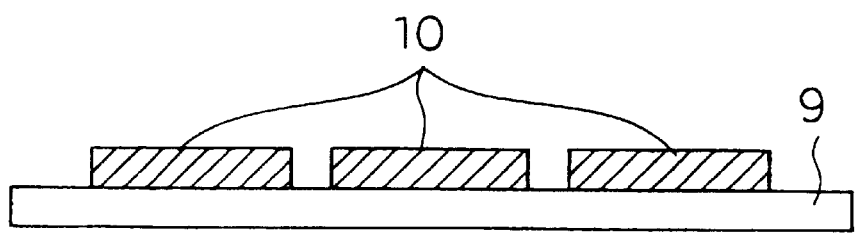
Figure 6:
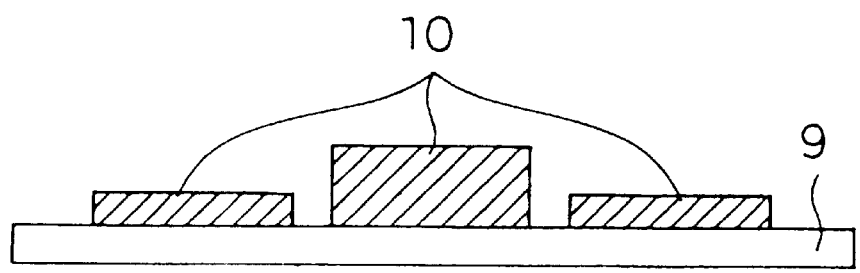

FIG. 4 is an enlarged view of the edge of the nozzle 100 according to the present invention. The slit gap adjustment means 15 and the slit gap adjustment means fixed parts 16 are omitted from the drawing.

The first feature is, as shown in FIG. 4, notches 17 are provided on both sides of each of the movable parts 18 in the upper block 11 in the discharge direction E.

The notches 17 are for adjustment after the applicator is manufactured. That is to say, they are provided for the purpose of adjusting each part of the slit gap by transforming the corresponding movable part 18 independently for each stripe.

If a nozzle 101 without notches is used for the movable parts 18 as shown in FIG. 5(a), when a power P is applied on the portion which discharges too much or on the portion (the central portion) where the part of the stripe coating film 10 is thick as shown in FIG. 5(c) of the discharge outlet in the coating applicator after manufactured, in order to narrow the slit gap h, the edge of the nozzle is transformed in a curve, which narrows not only the slit gap h" where the pushing power P is applied but also peripheral slit gaps h', h'.

As a result of the transformed slit gap h in a curve, the stripe coating film 10 for each stripe is also curved on the surface in the cross section as shown in FIG. 5(b), which cannot make the thickness of the stripe coating film 10 uniform.

On the contrary, in a stripe coating applicator using the nozzle 100 according to the embodiment 1 of the present invention, even if a pushing power P is applied to a portion for a stripe with too much discharge or for a thick stripe (the central portion) of the stripe coating film 10 as shown in FIG. 6(c), the moving part 18 for each stripe is displaced independently as shown in FIG. 6(a), so that the slit 7 keeps itself in parallel forming a slit gap h" without transforming the adjoining movable parts 18 for the adjoining stripes.

Accordingly, it has become possible to transform only stripes with too much discharge or thick stripe parts of the coating film independently in the film thickness, therefore, it is easy to uniform the film thickness of the stripe coating film 10 for each stripe as shown in FIG. 6(b).

As shown in FIG. 4, the width W1 of the notches 17 needs to be 0.01 mm or more in order to prevent the adjoining movable parts 18 from interfering and in order to prevent transformations of the adjoining movable parts 18 from interfering to each other through the fluid friction of the coating fluid 2 exuding from the slit 7. Besides, in order to prevent fluid leakage from the notches 17, it is desirable for the width W1 of the notches 17 to be less than the width W2 of the stripe partitions 8. Here, these stripe partitions 8 have an elasticity to a certain extent.

It is desirable for the length of the notches 17 to be from each of the thin parts 19 which is a bending point of the corresponding movable part 18, to the corresponding slit outlet in order to prevent transformations of the adjoining movable parts 18 from affecting each other.

The second feature of the present embodiment is described next.

The second feature, as shown in FIG. 3, is to provide a slit gap adjustment means 15 on top of each of the movable parts 18 and, by means of a pushing power from the means 15, the corresponding thin part 19 works as a bending point.

The present embodiment 1 is described in the case where piezo-actuators are adapted as the slit gap adjustment means 15.

By pushing a movable part 18 with a micro displacement force of one of the piezo-actuators, the slit gap is changed in the order of $\mu$m, so that it becomes possible to finely control the discharge, which makes it easy to uniform the film thickness.

When a pushing power force is applied to a movable part 18 by one of the piezo-actuators, that piezo-actuator itself receives a reaction force against the pushing force, therefore, it is desirable to attach screws to secure the piezo-actuators on the slit gap adjustment means fixed parts 16 firmly.

Furthermore, in order to prevent movable parts 18 from becoming inoperable due to a plastic deformation, it is desirable for the thin parts 19 to have such a thickness that, even if the maximum force is generated by one of the piezo-actuators to be applied to the corresponding movable part 18 as the pushing power, the deformation won't exceed the limit of elasticity of the part, where it gives a predetermined amount of movement to the part.

The third feature of the present embodiment is described next.

The third feature is, as shown in FIG. 4, to provide with stripe partitions 8 on the slit surface of the lower block 12, corresponding to the positions of the notches 17 provided in the upper block 11.

The stripe partitions 8 are provided so that the flow of the coating fluid is divided when being pushed out of the manifold 6 into the slit 7. In addition, they function so as to prevent the coating fluid from leaking from the notches 17.

The stripe partitions 8 could have the structure including an elastic body such as a Teflon tape, so that the movable parts 18 are able to transform themselves while keeping the slit 7 in parallel for the purpose of a stable slit gap adjustment, without receiving a counter power conveyed through a stripe partition 8 working as a fulcrum.

By providing the stripe partitions 8 in the positions extending from the manifold 6 i.e. each of the slit inlets to the corresponding slit outlet, the flow of the coating fluid from the manifold 6 to the slit outlets is divided smoothly to uniform the discharge of the coating fluid and to gain an even stripe coating film 10 with less inconsistency in the film thickness.

The width W2 of the stripe partitions corresponds to the width of uncoated stripes 20 as shown in FIG. 7.

To describe the effects of the present embodiment 1, a stripe coating applicator utilizing the nozzle 100 described in accordance with the present embodiment 1 is used to make a comparison in each of examples 1, 2 and 3 with respect to (1) the results of measuring the film thickness for each stripe in the coating width direction when a coating fluid is applied on the surface of a base under the conditions where the movable parts 18 are not transformed at all, and (2) the results of measuring the film thickness when the slit gap h is narrowed by transforming a movable part 18 for a thick stripe in the film thickness.

EXAMPLE 1

Using the nozzle 100 described in the present embodiment 1, coating fluid prepared by adding carbon to sodium carboxymethyl cellulose water solution with the viscosity of 1500 cp at the shear rate of 1000 sec$^{-1}$ is coated on the surface of a base (copper foil with the thickness of 30 m) at a flow rate of 0.1 cc/cm/sec per unit width.

The nozzle 100 is made of stainless with the arrangement for three stripes, each of which has a stripe coating width of 45 mm, a slit gap of 0.25 mm, and a thin part 19 being 3 mm in the thickness.

Figure 13:
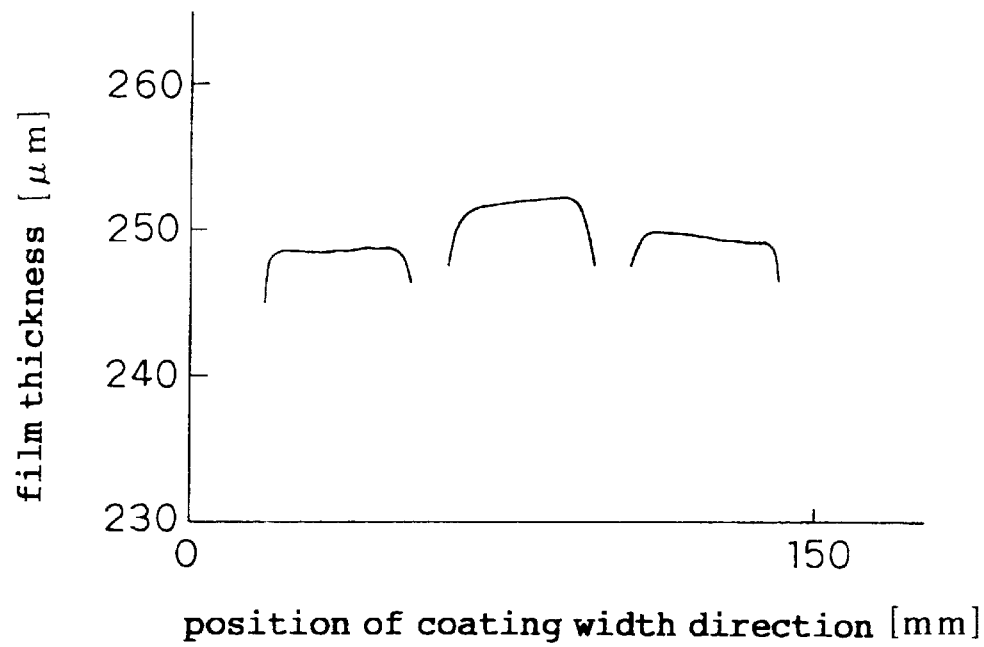
FIG. 13(a) is a diagram showing the result of measuring the film thickness distribution of a stripe coating film through a slit gap before adjustment according to the (example 1) of the present invention.
FIG. 13(b) is a diagram showing the result of measuring the film thickness distribution of a stripe coating film through a slit gap after adjustment according to the (example 1) of the present invention.
Figure 13:
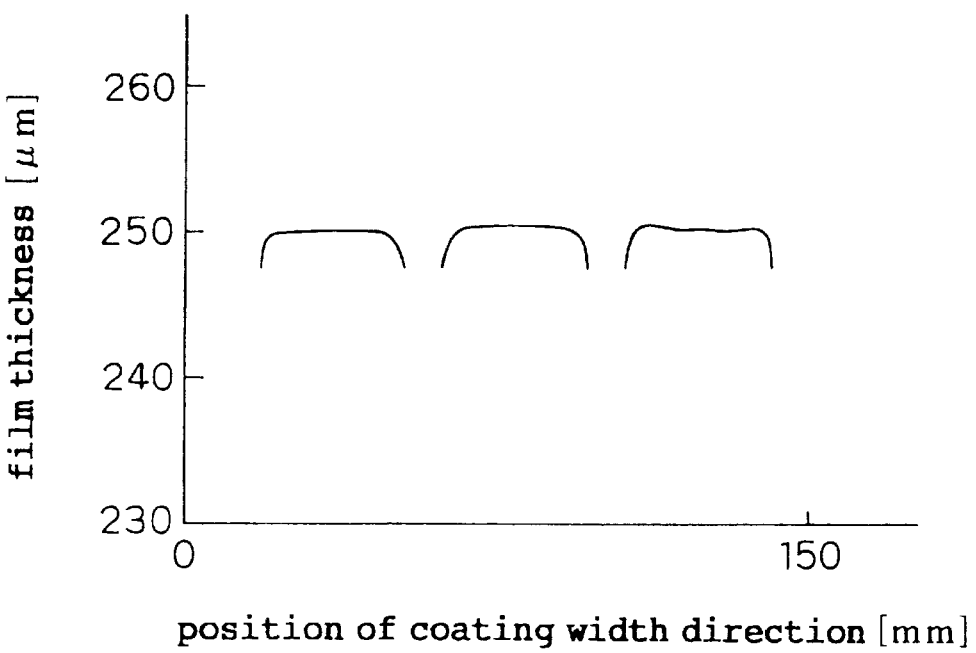

FIG. 13(a) represents the result of measuring the film thickness applied under the conditions where the movable parts 18 are not transformed. And FIG. 13(b) represents the result of measuring the film thickness applied when movable parts 18 are transformed for thick stripes in the film thickness based on the result of FIG. 13(a).

As shown in FIG. 13(a), when coating is applied without transforming the movable parts 18 at all, the central stripe became thicker than the others in the film thickness.

One of the reasons for this is that the central stripe has got more discharge because the supplying pipe 14 for the coating fluid to the nozzle 100 is provided in the middle.

This might also be caused by the inconsistency of micro slit gaps of the nozzle 100 in the mechanical precision described in the present embodiment 1.

Micro displacement is added only onto the movable part 18 of the central stripe by the corresponding slit gap adjustment means 15, so that the inconsistency in the mechanical precision is corrected, which has reduced the approximate 3% of the inconsistency in the film thickness of the stripe coating in the coating width direction when the coating is applied without transforming the movable parts 18 to 1% of the inconsistency in the film thickness as shown in FIG. 13(b), which is a great reduction of the inconsistency.

EXAMPLE 2

In this example 2, sodium carboxymethyl cellulose water solution with the different viscosity from that of the above mentioned example 1 is used. Namely, using the nozzle 100 described in the present embodiment 1, coating fluid prepared by adding carbon to sodium carboxymethyl cellulose water solution of which viscosity is 3000 cp at the shear rate of 1000 sec$^{-1}$ is applied on the surface of a base (copper foil with the thickness of 30 μm) at a flow rate of 0.1 cc/cm/sec per unit width.

The nozzle 100 is made of stainless with the arrangement for three stripes, each of which has a stripe coating width of 45 mm, a slit gap of 0.25 mm, and a thin part 19 being 3 mm in the thickness.

Figure 14:
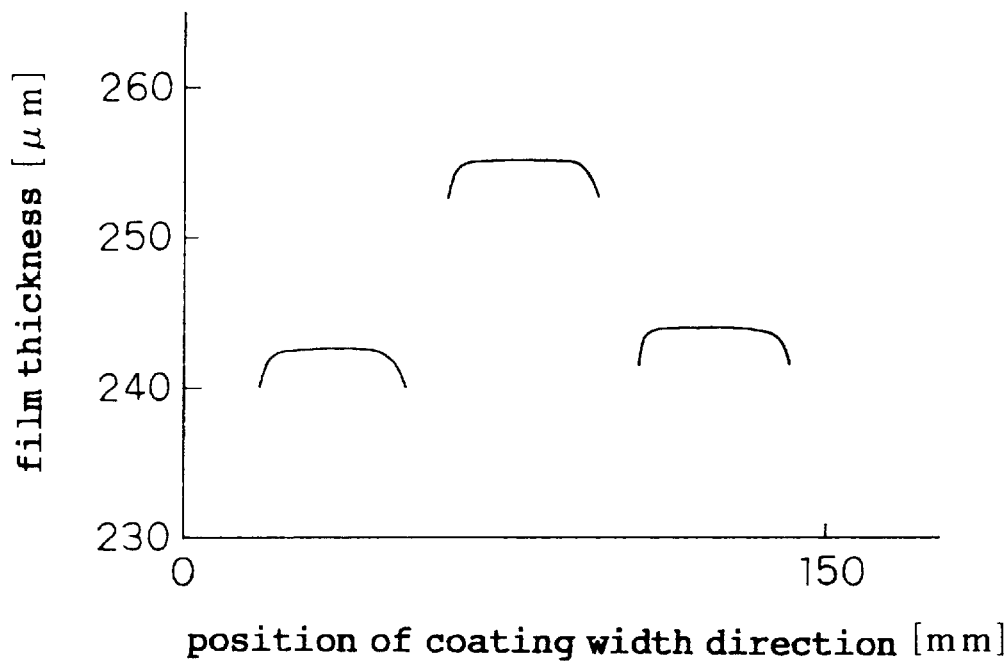
FIG. 14(a) is a diagram showing the result of measuring the film thickness distribution of a stripe coating film through a slit gap before adjustment according to the (example 2) of the present invention.
FIG. 14(b) is a diagram showing the result of measuring the film thickness distribution of a stripe coating film through a slit gap after adjustment according to the (example 2) of the present invention.
Figure 14:
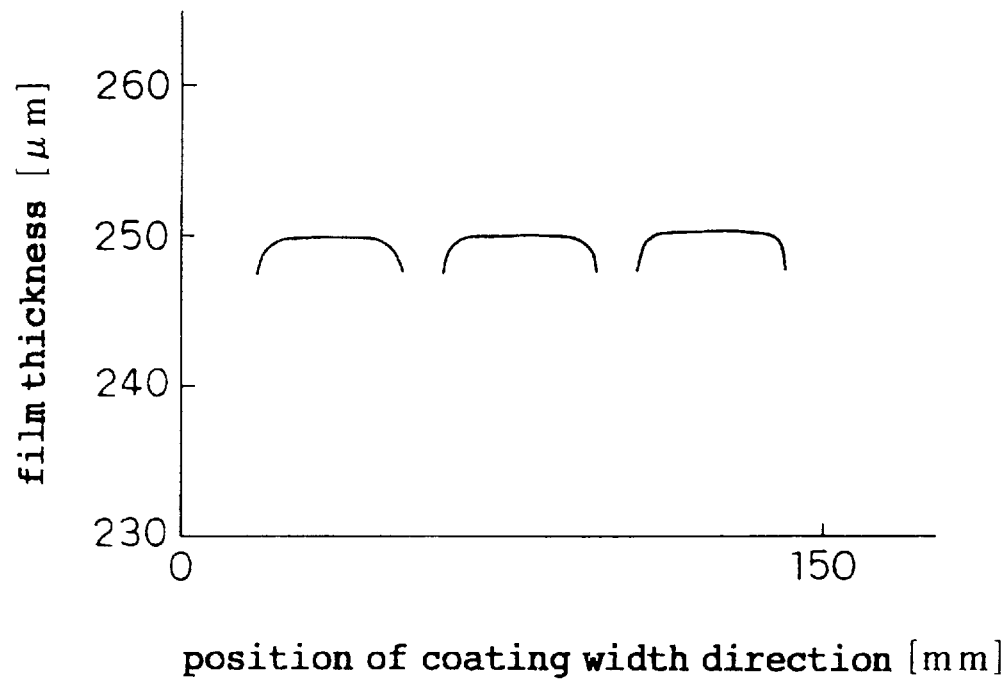

FIG. 14(a) represents the result of measuring the film thickness applied under the conditions where the movable parts 18 are not transformed. And FIG. 14(b) represents the result of measuring the film thickness applied when movable parts 18 are transformed for thick stripes in the film thickness based on the result of FIG. 14(a).

When coating is applied without transforming the movable parts 18 at all, the central stripe is thick in the film thickness as shown in FIG. 14(a) in the same way as example 1. Because of the higher viscosity of the coating fluid than the case of example 1, the flowability is poor and the inconsistency of the film thickness is as high as 5%.

Therefore, by adding a micro displacement onto a movable part 18 by means of the corresponding slit gap adjustment means 15 so that the inconsistency of the film thickness is corrected, the inconsistency in the film thickness has become 1% as shown in FIG. 14(b), which proved that even the coating fluid with different viscosity can be uniformed easily.

EXAMPLE 3

Using the nozzle 100 described in the present embodiment 1, coating fluid prepared by adding carbon to sodium carboxymethyl cellulose water solution of which viscosity is 1500 cp at the shear rate of 1000 sec$^{-1}$ is applied on the surface of a base (copper foil with the thickness of 30 μm) at the flow rate of 0.1 cc/cm/sec per unit width.

The nozzle 100 is made of stainless with the arrangement for three stripes, each of which has a stripe coating width of 45 mm, a slit gap of 0.25 mm, and a thin part 19 being 5 mm in the width and 3 mm in the thickness. The supplying pipe 14 is not used and the coating fluid is supplied from the side of the side block 13L.

Figure 15:
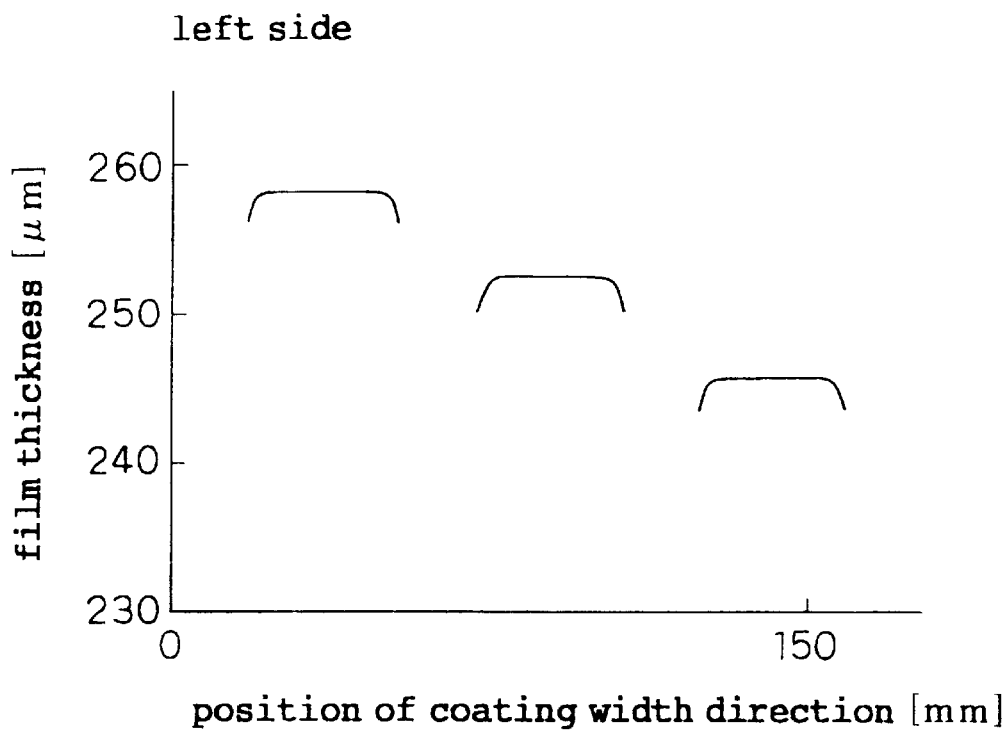
FIG. 15(a) is a diagram showing the result of measuring the film thickness distribution of a stripe coating film through a slit gap before adjustment according to the (example 3) of the present invention.
FIG. 15(b) is a diagram showing the result of measuring the film thickness distribution of a stripe coating film through a slit gap after adjustment according to the (example 3) of the present invention.
Figure 15:
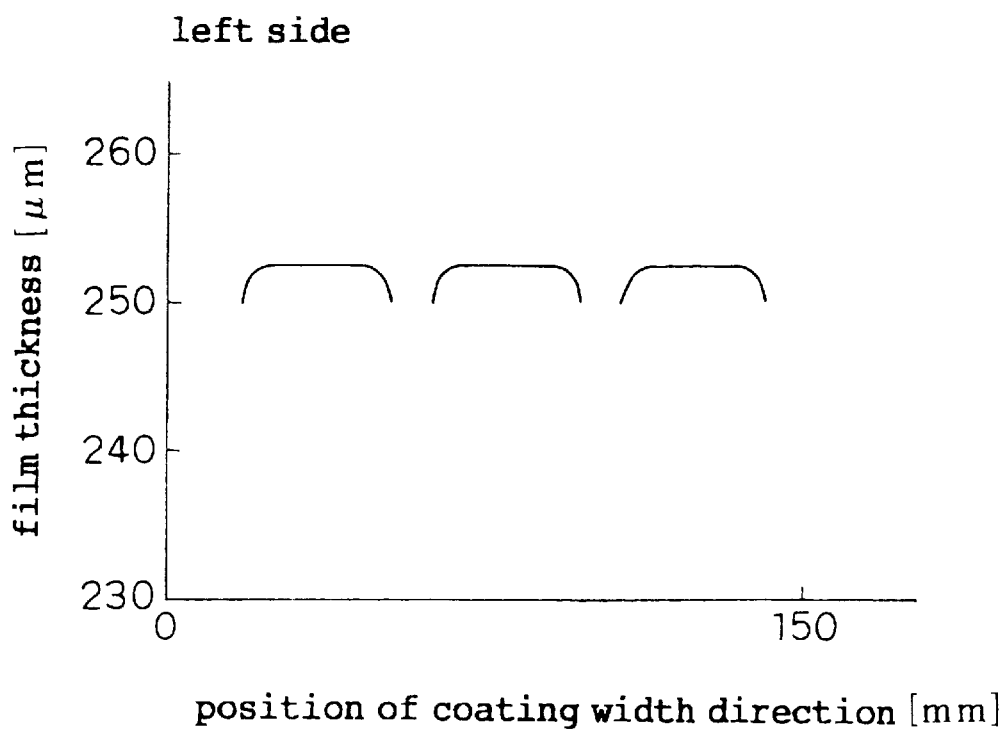

FIG. 15(a) represents the result of measuring the film thickness applied under the conditions where the movable parts 18 are not transformed. And FIG. 15(b) represents the result of measuring the film thickness applied when movable parts 18 are transformed for thick stripes in the film thickness based on the result of FIG. 15(a).

In case coating is applied without transforming the movable parts 18 at all, the stripe on the left side (supply side of the coating fluid) is thicker than the others in the film thickness as shown in FIG. 15(a).

Therefore, by adding a micro displacement onto the movable part 18 for the stripe on the left side by means of the slit gap adjustment means 15 so that the inconsistency in the film thickness is corrected, the inconsistency in the film thickness has become 1% as shown in FIG. 15(b), which proves that the coating can be easily uniformed even in case the supplying pipe for the coating fluid is changed in the position.

The effects of the present embodiment 1 are summarized and described in the following.

First, it becomes possible to adjust the discharge for each stripe by providing the notches 17 on the nozzle movable parts 18 of the nozzle 100 according to the present invention, and even in the case of stripe coating, it has become easy to uniform the stripe coating film 10 in the thickness over the entire coating width direction.

Secondary, by using a stripe coating applicator using the nozzle 100 according to the present invention, it has become easy to uniform the stripe coating film 10 in the film thickness over the entire coating width direction, even in case coating fluid lots at the production site are changed or the coating fluid within the applicator has changed in the flow property.

Thirdly, even if the supplying pipe 14 of the nozzle 100 according to the present invention is provided in a position other than the center, by transforming movable parts 18 for thicker stripes, it has become easy to uniform the stripe coating film 10 in the film thickness over the entire coating width direction.

EMBODIMENT 2

Referring to FIGS. 8–12, the second embodiment according to the present invention is described next.

Figure 8:
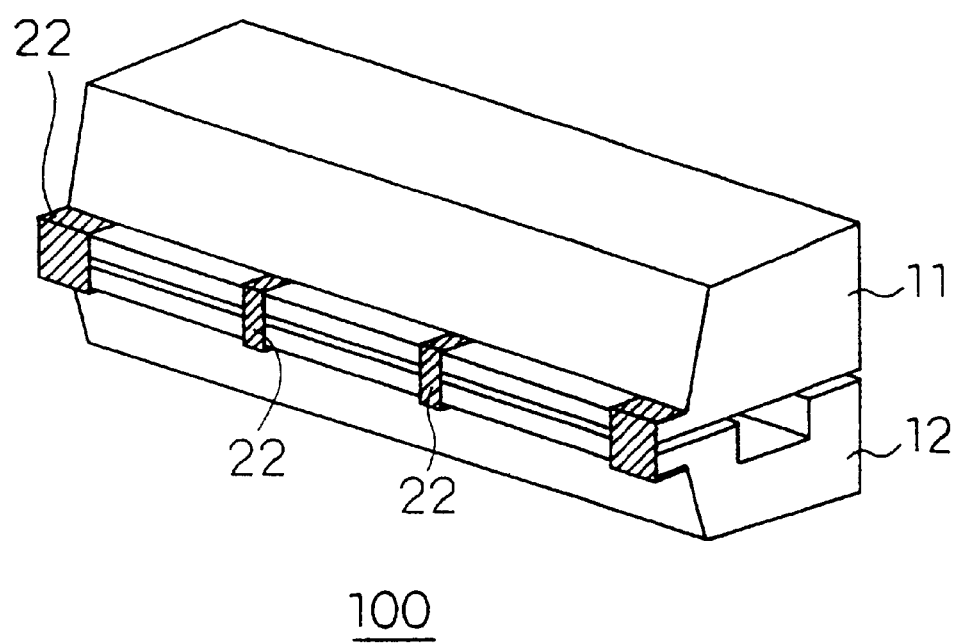
FIG. 8 is a perspective view of a nozzle exhibiting the feature of the embodiment 2 according to the present invention.
Figure 9:
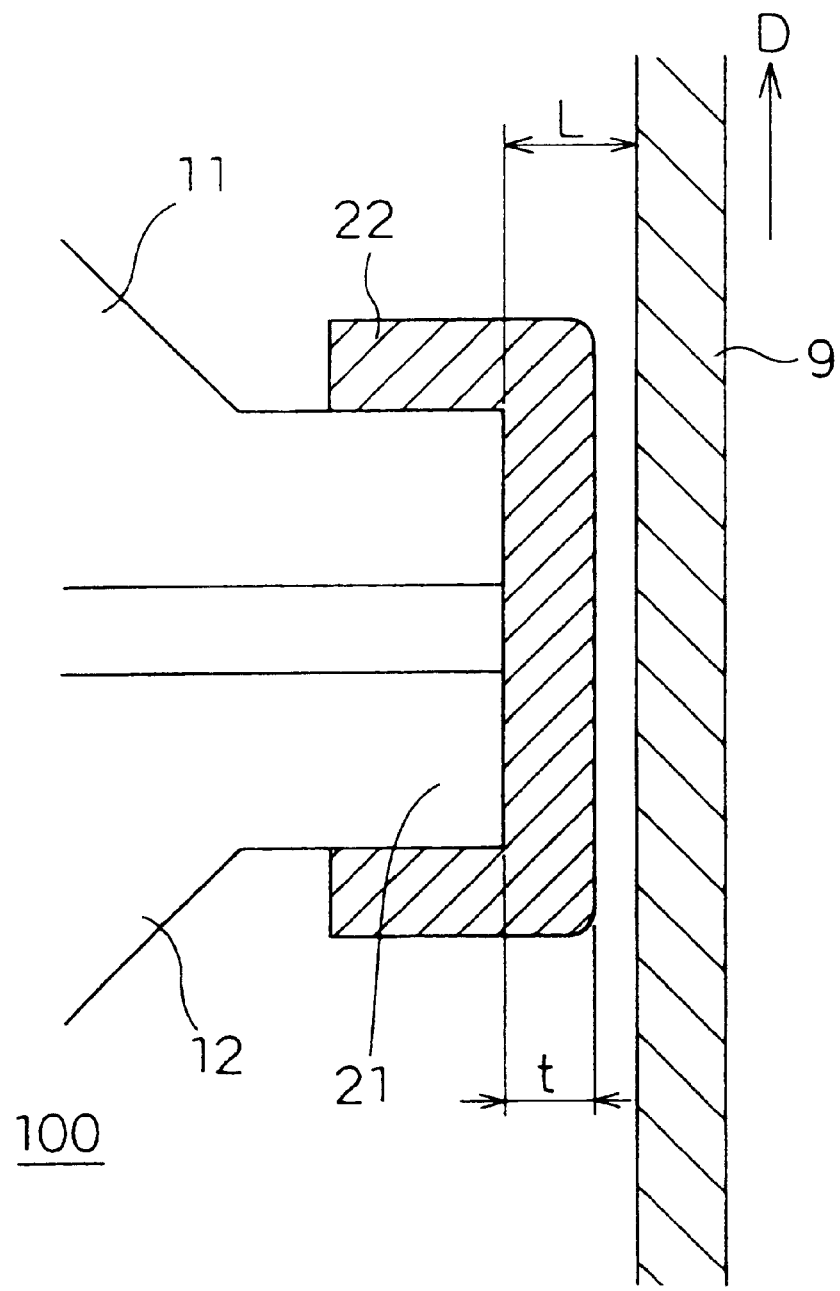
FIG. 9 is an enlarged cross section view of a nozzle edge exhibiting the feature of the embodiment 2 according to the present invention.

First of all, the structures of the applicator and the nozzle according to the present invention are described. FIG. 8 is a schematic view of the conditions where the nozzle 100 according to the present embodiment 2 is provided with stripe control members 22. And FIG. 9 is an enlarged side view of the edge of the nozzle 100 according to the present embodiment provided with stripe control members 22.

The configuration of the applicator according to the present embodiment is the same as the embodiment 1, as shown in FIG. 1.

The structure of the nozzle 100 according to the present embodiment is basically the same as that of the embodiment 1, however, as shown in FIG. 8, a stripe control member 22 corresponding to the width of each of the uncoated stripes 20 and having a property described below is provided to the portion corresponding to the position of each of the uncoated stripes 20 at the slit outlets of the nozzle 100. That is to say, to the front surface of each of the stripe partitions 8, a stripe control member 22 with the same width as the stripe partition is attached (see FIG. 12).

In the present embodiment 2, unlike in the embodiment 1, the slit gap adjustment means may not be provided on top of the upper block 11 or the configuration may not be provided with the notches.

The first feature of the present embodiment is described next.

The first feature of this embodiment is, as shown in FIG. 8, the slit outlets of the nozzle 100 are provided with stripe control members 22 corresponding to the width of uncoated stripes 20.

In a conventional extrusion type coating applicator, in case the fluid pressure is increased on both sides of each stripe coating width immediately after the discharge influenced by the flow properties of the coating fluid 2, bumps may be generated on both sides of each stripe of the stripe coating film 10. Therefore, conventionally, as shown in FIG. 10(c), the stripe partitions 8 are provided within the slit area as a taper broadening on the slit outlet side toward the discharge direction E of the coating fluid 2 so that the fluid pressure on both sides of each stripe coating width is lowered immediately after the discharge. By that means, however, as shown in FIG. 10(a), sagging instead of and opposed to bumps is generated on both sides of each stripe coating width immediately after the discharge.

In the present embodiment 2, therefore, to prevent the sagging, stripe control members 22 are provided. They prevent the sagging on both sides of each stripe coating width immediately after the discharge, and control the behavior of the coating fluid 2 when it is in condition of a coating film immediately after the application in order to stabilize the stripe width of the stripe coating film 10.

And as shown in FIG. 9, the stripe control members 22 can be firmly attached to the surface of the lip 21 under the manufacturing process, by having a shape covering the entire edge of the lip. As a result, it becomes easy to predetermine for manufacturing the distance from the front of the stripe control member 22 to the base.

Figure 11:
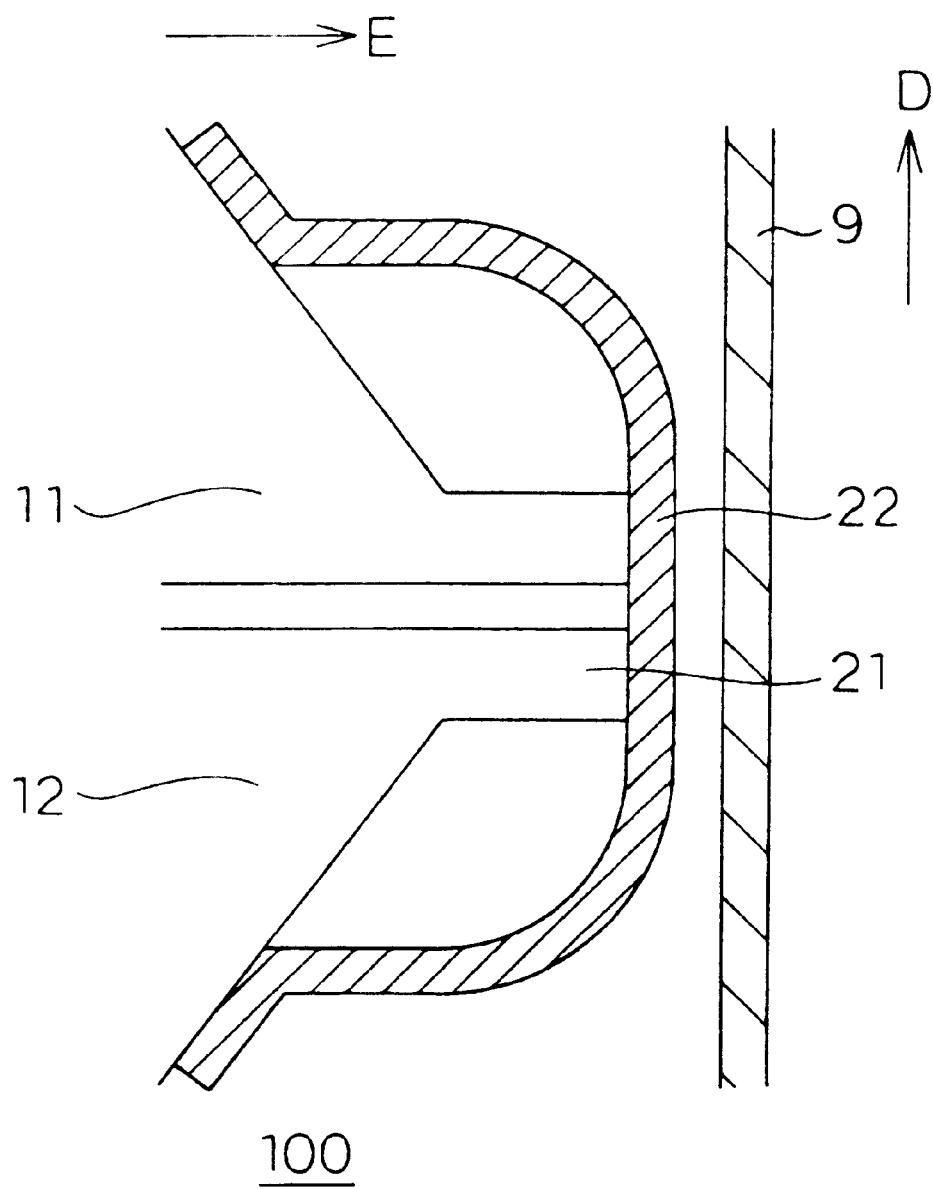
FIG. 11 is an enlarged section view of a stripe control member according to present invention (corresponding to Claim 7)

As shown in FIG. 11, a stripe control member 22 may have a shape so that it is attached in the middle closely onto the lip 21 of the nozzle 100, and the upper and the lower ends are screwed onto the upper and lower blocks 11 and 12 while the rest part is curved with its strong elasticity.

By doing that, the stripe control member 22 is secured more firmly on the edge of the lip 21. This helps to prevent the sagging more effectively and to control the behavior of the coating fluid 2 in condition of the coating film after the application so that the stripe width of the stripe coating film 10 is stabilized more effectively.

Figure 12:
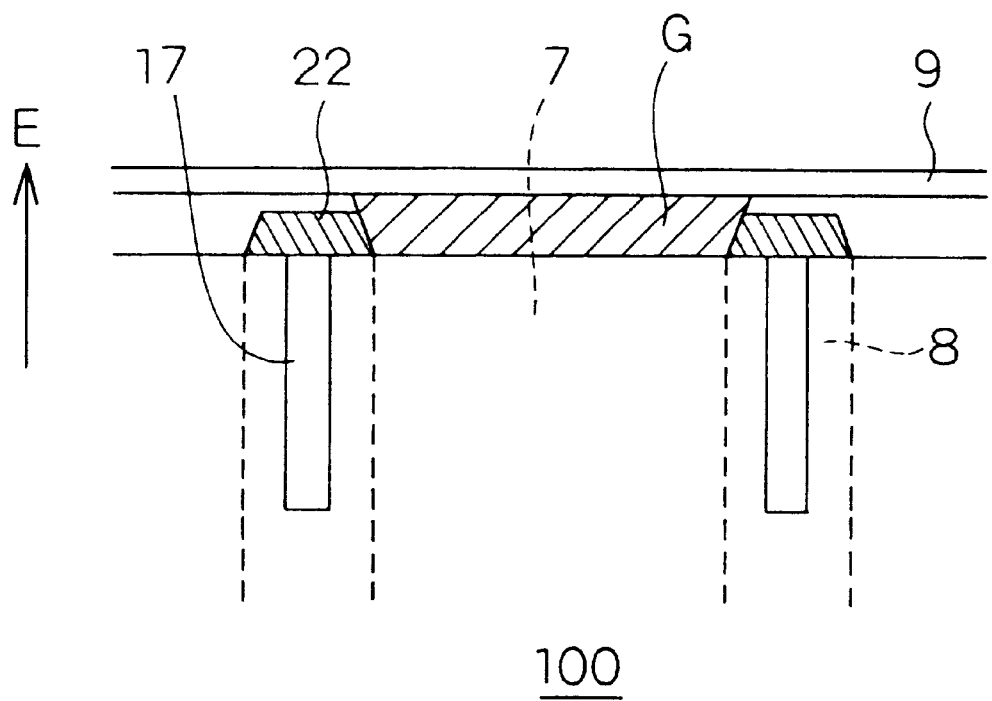
FIG. 12 is an enlarged plan view of a stripe control member according to present invention (corresponding to Claim 8)

Though the above mentioned stripe control member 22 can prevent the sagging, it must not cause bumps instead. As shown in FIG. 12, therefore, in a cross section of the stripe control member 22 in the direction of slit 7, in the discharge direction E of the coating fluid 2, the lip face side is a longer side and base side is a shorter side constructing a trapezoid, so that the space from the outlets of the slit 7 to the base 9 constructs a trapezoid in the cross section view in the coating width direction as shown with G in FIG. 12, namely, in this portion G, the fluid is held in a shape of trapezoid. As a result, the effects of controlling the fluid pressure is generated to prevent bumps from being generated.

By providing the stripe control members 22 having the above mentioned feature, the stripe coating film 10 with a stable stripe width and without any bumps is gained as shown in FIG. 10(b).

The second feature of the present embodiment is described next.

The second feature of this embodiment is to satisfy the following, as shown in FIG. 9, when the thickness of said stripe control members 22 is t and the distance from the slit outlets to the base 9 is L (hereinafter referred to as a coating gap) L−0.2 mm≦t≦L.

The coating gap is properly selected under the conditions including the coating thickness and the viscosity of the coating fluid.

The stripe control members 22 are provided to control the behavior of the coating fluid 2 in the conditions of the coating film just after the application. In case the thickness t of the stripe control members 22 is thinner than the coating gap L−0.2 mm, such a problem as that the coating fluid flows into a gap between each of the stripe control members 22 and the base 9 is caused, and then a stable stripe width of the stripe coating film 10 cannot be gained.

In case the thickness t of the stripe control members 22 is thicker than the coating gap L, the base 9 is pushed back to disturb the running conditions of the base. Then not only the sagging and an unstable stripe width of the stripe coating film 10 but also an uneven thickness of the coating will follow.

Accordingly, it is important to have a proper gap from each of the stripe control members 22 to the base 9, which ranges most preferably from 0.01 mm to 0.1 mm under normal conditions.

In the stripe coating applicator, using the nozzle 100 described in the present embodiment 2, the thickness t of the stripe control members 22 is varied to see how the width of the uncoated stripes changes and if the sagging exists for each value of thickness t.

The effects of this will be described in the next example 4.

EXAMPLE 4

Using the nozzle described in the present embodiment 2, the coating fluid prepared by adding carbon to sodium carboxymethyl cellulose water solution of which viscosity is 1500 cp at the shear rate of 1000 $sec^{-1}$ is applied on the surface of a base (copper foil with the thickness of 30 $\mu m$) at the flow rate of 0.1 cc/cm/sec per unit width.

The nozzle is made of stainless with the arrangement for three stripes, each of which has a stripe coating width of 45 mm, and the slit gap of 0.25 mm, while the thin part is 5 mm in the width and 3 mm in the thickness, and the coating gap L is 0.5 mm.

The stripe control member is made of aluminum and is 2.5 mm in the width, and has 5 varieties of thickness between 0.2–0.6 mm, for each of which the coating is applied.

In case a stripe coating is applied using each of the nozzles with 5 varieties of stripe control members A–C in the example 4, the result of comparison in the width of uncoated stripes and in the existence of the sagging is shown in Table 1.

| | thickness [mm] | width of stripe-uncoated portion [mm] | sagging | remarks |
|---|---|---|---|---|
| control member A | 0.2 | 1.0 | none | not belonging to the present embodiment |
| control member B | 0.3 | 2.45 | none | belonging to the present embodiment |
| control member C | 0.4 | 2.5 | none | belonging to the present embodiment |
| control member D | 0.5 | 2.55 | none | belonging to the present embodiment |
| control member E | 0.6 | 0.5~3.6 | none | not belonging to the present embodiment |

In case the thickness is smaller than L−0.2 mm as in the case the coating is applied using the stripe control members A, the effects of controlling the behavior of the coating fluid by the stripe control members wear off and the coating fluid discharged from both edges of each stripe coating width spreads toward the base. Then the coating fluid goes around to the front of each of the stripe control members to narrow the width of uncoated stripes. Because the liquid pressure is released, the sagging is generated.

On the other hand, in case the thickness is larger than L as in the case when the coating is applied using the stripe control members E, the stripe control members push back the base so that the base is arched toward the direction of discharge. Then, after the base is detached from the nozzle edge, the force works in the direction to get the base back to its original position, which vibrates the base and both sides of each stripe of the stripe coating film have a waving shape along the running direction of the base.

On the contrary, in case the thickness t of the stripe control members is L−0.2≦t≦L, the effects of holding the fluid by the stripe control members works to form a stripe coating film with a stable stripe width and without the sagging.

Furthermore, as described in the example 1, by adjusting the slit gap for each stripe, a stripe coating film of which inconsistency of the film thickness is 1% or less can be gained over the entire coating width direction.

The effects of the present embodiment 2 are summarized and described as follows.

First, by providing stripe control members 22 with corresponding width to the uncoated stripes 20 to the positions of the uncoated stripes 20 at the slit outlets of the nozzle 100 according to the present invention, that is to say, to the portions corresponding to the parts of the stripe partitions 8, it has become possible to prevent the sagging on both sides of a stripe of the stripe coating film 10, while the width precision of the coated and uncoated stripes 20 in the stripe coating film 10 can be improved.

Secondary, in case the thickness t of the stripe control member 22 is in the range of L−0.2≦t≦L, the effects of controlling the behavior of the coating fluid 2 by the stripe control members 22 work to gain the stripe coating film 10 with a stable stripe width and without the sagging.

EMBODIMENT 3

Referring to FIGS. 16–19, the third embodiment according to the present invention is described.

First of all, the configurations of the applicator and the nozzle according to the present embodiment 3 are described.

Figure 16:
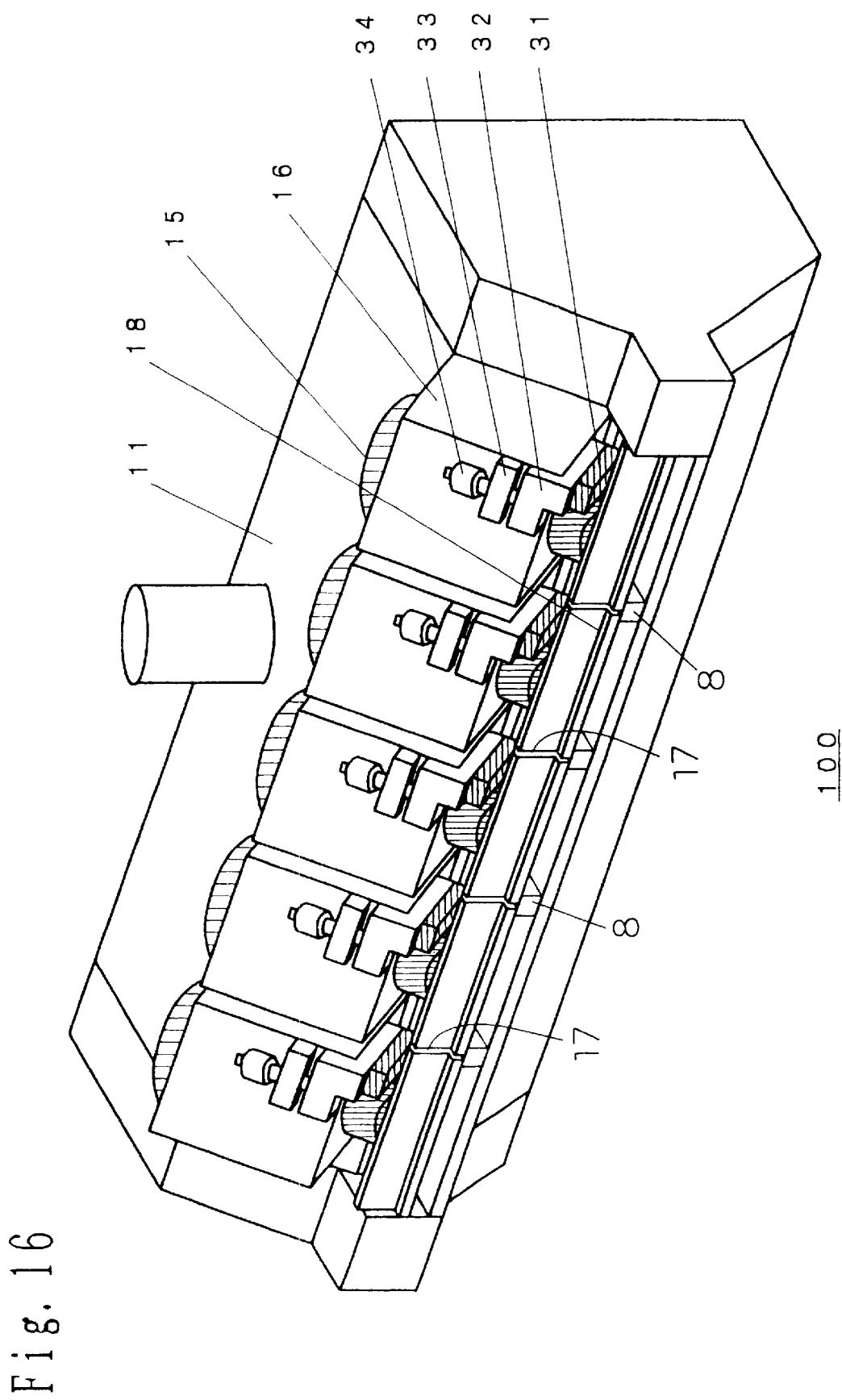
FIG. 16 is a perspective view of a nozzle exhibiting the feature of the embodiment 3 according to the present invention.

FIG. 16 is a schematic view of the nozzle 100 of the present embodiment 3 comprising a displacement sensor 31.

The configuration of the applicator according to the present embodiment 3 is same as the embodiment 1 as shown in FIG. 1.

The structure of the nozzle 100 according to the present embodiment 3 is basically same as the embodiment 1.

As shown in FIG. 16, each of the slit gap adjustment means fixed parts 16 at a portion corresponding to the place where corresponding slit gap adjustment means 15 is fixed is provided with a displacement sensor 31, a displacement sensor movable part 32, a zero point adjustment fixed part 33 and a zero point adjustment means 34.

The zero point adjustment means fixed part 33 is attached to the lower end of the slit gap adjustment means fixed part 16, and said zero point adjustment means 34 is connected to said zero point adjustment means fixed part 33 with screws. In addition, said displacement sensor movable part 32 is fixed to the zero point adjustment means 34, and said displacement sensor 31 is fixed to the displacement sensor movable part 32.

This displacement sensor 31 is to measure the movement of the movable part 18. The zero point adjustment means 34 is a means for initially adjust the gap between the displacement sensor 31 and the movable part 18.

The movable part 18 is moved by the slit gap adjustment means 15 held on the slit gap adjustment means fixed part 16 to a position detected by the displacement sensor 31. And the zero point adjustment means 34 is needed to zero adjust the initial position of the displacement sensor 31.

The structures of the upper block 11 without notches are also included in the scope of the present invention. That is to say, such a case as to where the adjustment is carried out with the entire slit is also included in the scope of the invention.

The structure of a feedback system according to the present embodiment 3 is described next.

Figure 17:
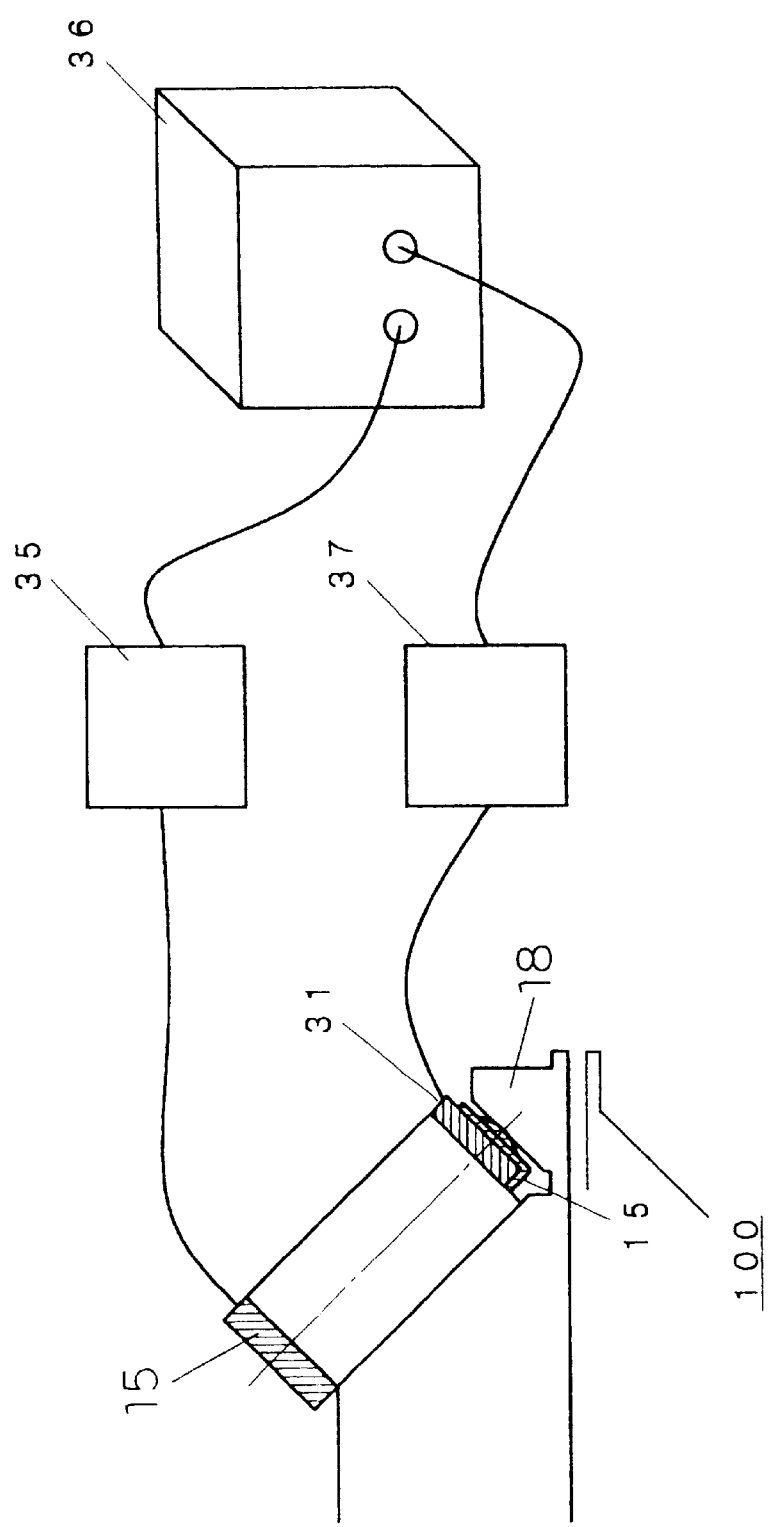
FIG. 17 is a schematic view of a feedback system exhibiting the feature of the embodiment 3 according to the present invention.
Figure 20:
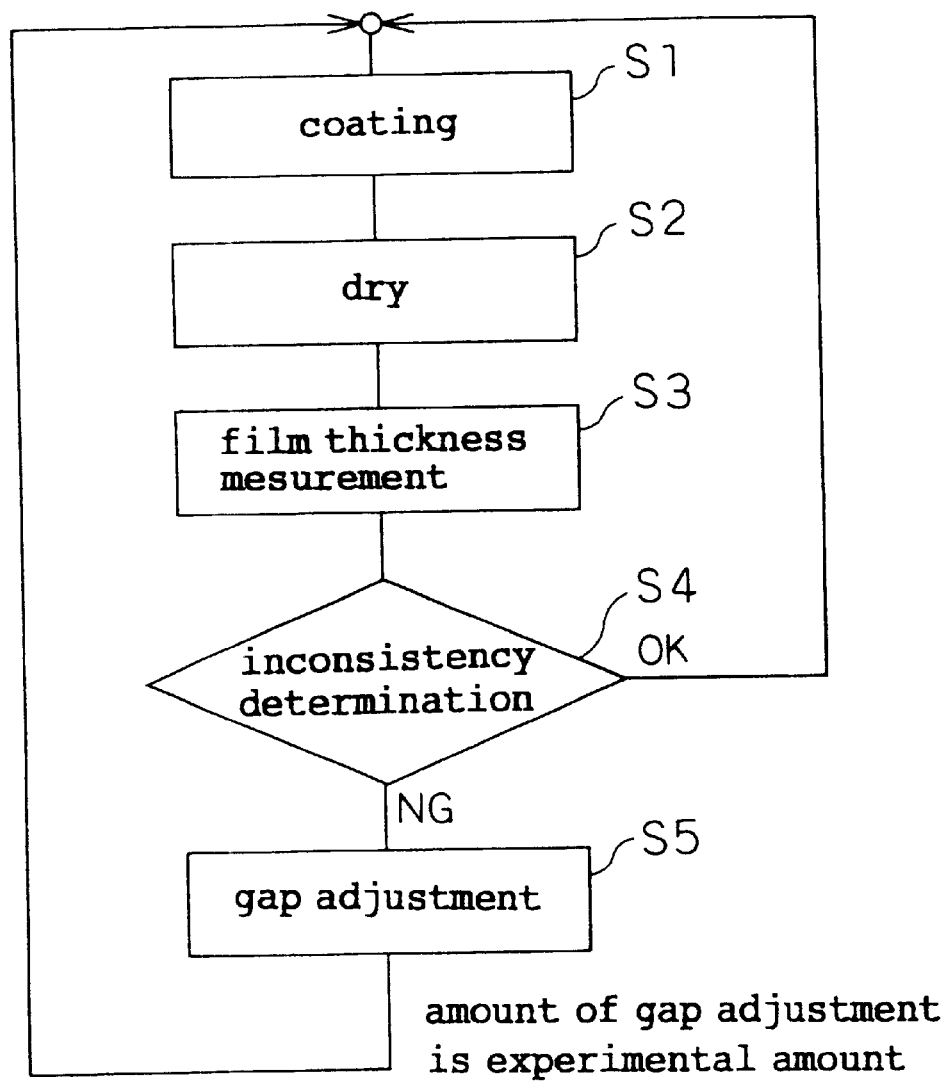
FIG. 20 is a flow chart of a feedback system according to the FIG. 21 of the present invention.
Figure 21:
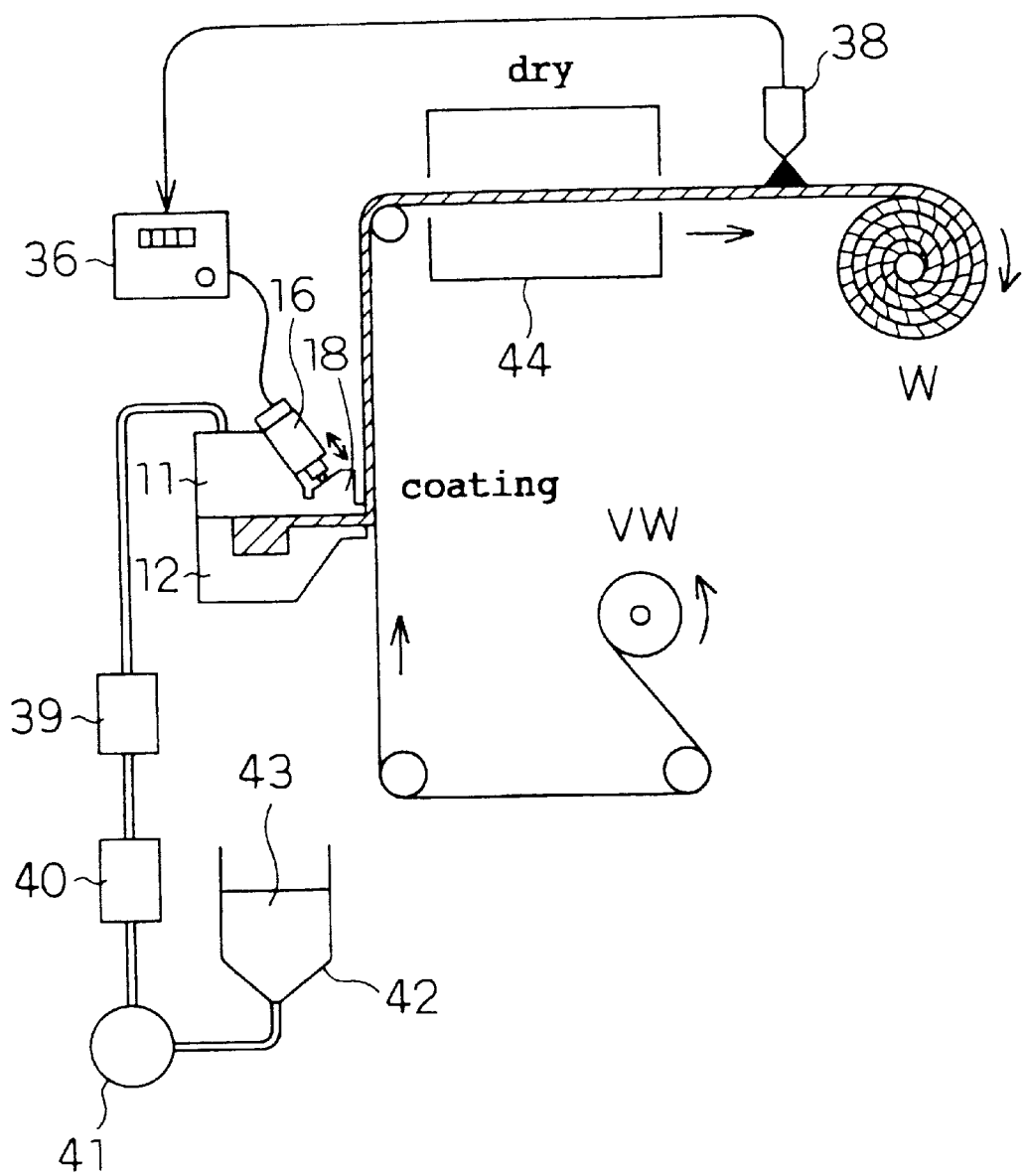
FIG. 21 is a schematic view of a feedback system exhibiting the feature of the embodiment 3 according to the present invention.

FIGS. 17 and 21 are schematic views of a feedback system using a slit gap adjustment means 15 and a displacement sensor 31 according to the present embodiment 3. And FIG. 20 is a flow chart to control it.

As shown in FIGS. 17 and 21, the film thickness after the coating is dried (S1, S2) is measured by a film thickness gauge 38 (S3). Receiving the result of the measurement, a feedback controller means 36 determines if the film thickness falls within tolerance of the inconsistency or not (S4).

As a result of the determination, in case it exceeds the tolerance of the inconsistency, the feedback control means 36 indicates said slit gap adjustment means 15, through the slit gap adjustment means controller 35, that the movable part 18 moves properly (S5). For that purpose, the relationship between the adjusted thickness of the film thickness and the movement of the movable part 18 is supposed to be gained by the experiment in advance. For example, the gained data should indicate that the movable part 18 is to be moved toward the direction which makes the slit thinner by 1.5 $\mu$m in case the thickness of the film is 1 $\mu$m too thick.

The displacement sensor 31 detects the movement of the movable part. The feedback control means 36 is informed of the detection result through the amplifier 37. Based on the detection result from the displacement sensor 31, the feed back control means 36 further moves the movable part 18. In this way, the feedback control means 36 controls the movable part 18 with feedback to move it to a target position. In FIG. 21, 39 is a flow meter, 40 is a filter, 41 is a pump, 42 is a tank, 43 is a coating material, and 44 is a dryer.

The first feature of the present embodiment is described next.

The first feature of the present embodiment is, as shown in FIG. 16, a displacement sensor 31 for measuring the movement of each of the movable parts 18 is provided in the vicinity of a movable part 18 of the nozzle having the corresponding slit gap adjustment means 15.

In order to change the slit gap in the order of $\mu$m, to control the discharge microscopically, and to uniform the thickness of the film, it is important to measure the displacement of each of the movable parts 18 precisely and rapidly.

If the displacement sensor 31 is provided at a place far away from the movable part 18, the measurable range of the displacement sensor 31 is expanded with a large resolution, it becomes difficult to measure the micro displacement. And because of a long measurement distance, it is difficult to quickly grasp a micro transforming movement of the movable part 18, leading to a lower responsivity.

By providing a displacement sensor 31 in the vicinity of the movable part 18, it becomes easy to narrow the measurable range, to make the resolution smaller, to shorten the measurement distance, and to increase the responsivity, so that it becomes possible to measure the displacement amount of the movable part 18 precisely and rapidly.

It is desirable for the measurable range of the displacement sensor 31 to be 1 mm or less with the resolution of 0.5 $\mu$m or less.

The second feature of the present embodiment is described next.

The second feature of the present embodiment is, as described above and shown in FIG. 17, a feedback is applied to a slit gap adjustment means 15 based on a numerical value outputted from the displacement sensor 31.

The case is described where the slit gap measurement means 15 is a piezo-actuator.

Generally speaking, a piezo-actuator is controlled by voltage, with the characteristics that displacement amount under the same voltage differs in the direction between expanding and shrinking, therefore, it is difficult to control the discharge microscopically just by providing the slit gap adjustment means. It is also difficult to uniform the thickness of the film for short time because it takes time to reach to a predetermined displacement amount.

By adapting a feedback system shown in FIG. 17, it has become possible to control a piezo-actuator highly precisely in either direction, and it has become easy to control microscopically the discharge amount. And because the time is reduced to reach a predetermined displacement amount, it also becomes easy to uniform the thickness of the film in short time.

The third feature of the present embodiment is described next.

Figure 18:
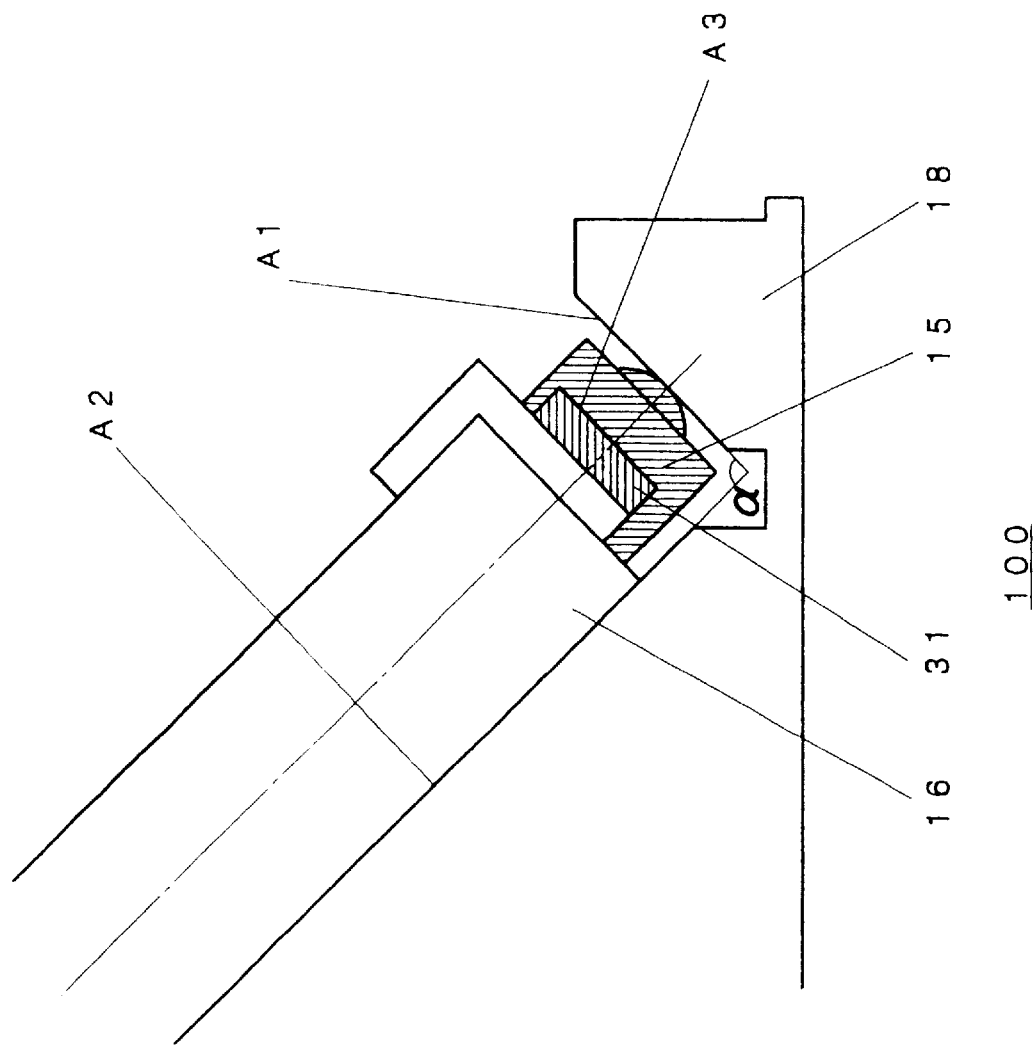
FIG. 18 is an enlarged cross section view of a nozzle showing a position where a displacement sensor is attached in the embodiment 3 according to the present invention.

FIG. 18 is an enlarged cross section view of the nozzle 100 with the displacement sensor 31 attached in the embodiment 3 according to the present invention.

The third feature of the present embodiment is, as shown in FIG. 18, the angle $\alpha$ is 90 degrees formed between the surface A1 of each of the movable parts 18 in contact with the corresponding slit gap adjustment means 15, and the surface A2 on which the corresponding slit gap adjustment means fixed part 16 is secured.

To measure the movement of the movable part 18 precisely with the initial value where the movable part 18 is not transformed, it is necessary to measure precisely the distance D from the measurement surface A3 of the displacement sensor 31 to the measured surface A1 of the movable part 18, and for that purpose, it is important for A1 and A3 to be parallel to each other.

Unless A1 and A3 are parallel to each other, it is difficult to measure precisely because of the growing unevenness of the current values sensed at the displacement sensor 31.

By forming a 90 degree angle between A1 and A2 as shown in FIG. 18, the displacement sensor 31 just attached to the slit gap adjustment means fixed part 16 processed highly precisely for the parallelism and squareness easily makes A1 and A3 to be parallel to each other.

It is desirable for the angle $\alpha$ to be in a range of: $88° \leq \alpha \leq 92°$.

The forth feature of the present embodiment will be described next.

Figure 19B:
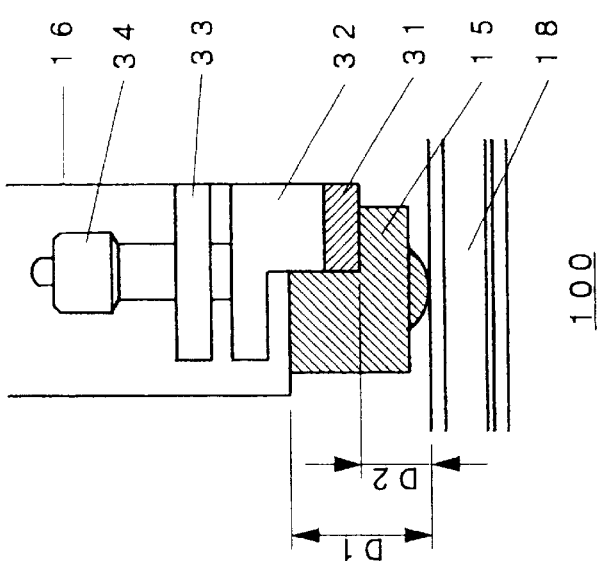
FIG. 19(b) is an enlarged plan view of a nozzle in case a displacement sensor movable part is provided in the embodiment 3 according to the present invention.

FIG. 19(b) is an enlarged plan view of the nozzle equipped with the displacement sensor movable part 32 and the like according to the embodiment 3 of the present invention.

Figure 19A:
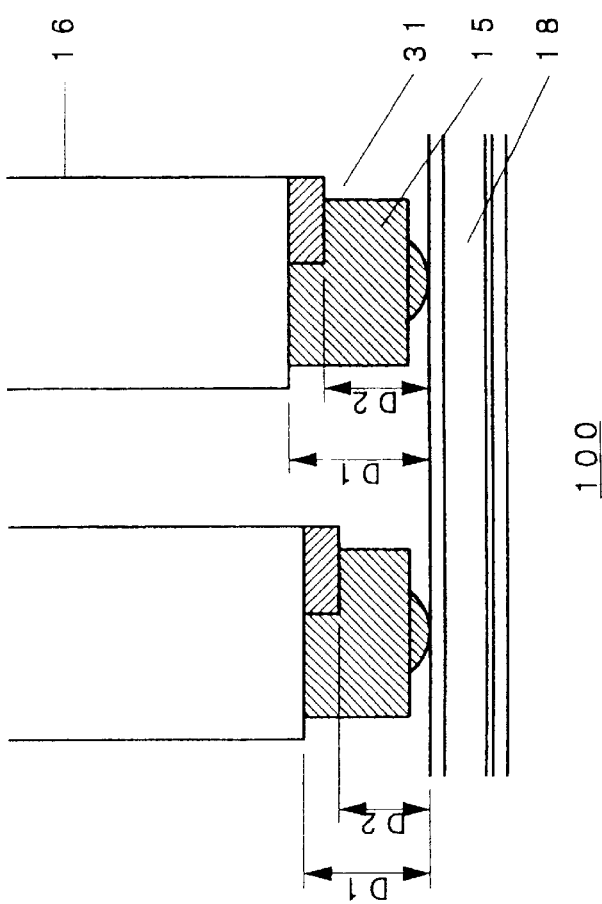
FIG. 19(a) is an enlarged plan view of a nozzle in case a displacement sensor movable part is not provided in the embodiment 3 according to the present invention.

In comparison with this, in FIG. 19(a), an enlarged plan view of the nozzle is shown where such a displacement sensor movable part 32 for adjusting the position of the displacement sensor 31, the zero point adjustment means 34 and the zero point adjustment fixed part 33 or the like are not equipped at all.

The forth feature of the present embodiment is, as shown in FIG. 19(b), that the displacement sensor movable part 32 is provided for maintaining a gap between the displacement sensor 31 and the movable part 18 to a constant amount in the slit gap adjustment fixed part 16, and the zero point adjustment means 34 is also provided for setting the gap as an initial value.

In a nozzle as shown in FIG. 19(a), a plurality of slit gap adjustment means 15 are used and because the length is slightly different for each of the slit gap adjustment means 15, the length D1 sticking out from the slit gap adjustment means fixed part 16 is uneven.

If the displacement sensor 31 is attached under this condition, because of the unevenness of the gap amount D2 with the movable part 18, it becomes impossible to measure the displacement amount highly precisely.

It is also difficult to set an initial value highly precisely where the movable part 18 is not transformed.

By providing a displacement sensor movable part 32 to the slit gap adjustment means fixed part 16 as shown in FIG. 19(b), it becomes possible to make D2 uniform even if D1 is uneven.

For that purpose, a finely adjustable zero point adjustment means 34 is provided for moving the displacement sensor movable part 32 with high precision. Thereby it becomes easy to set D2 highly precisely where the movable part 18 is not transformed.

It is desirable to adjust finely while pinching and holding a zero point adjustment board with a highly precise thickness of a non-magnetic insulator.

The effects of the present embodiment 3 are summarized and described as follows next.

First, because a displacement sensor 31 is provided in the vicinity of a movable part 18 of the nozzle 100 according to the present invention, and a feedback is applied to the slit gap adjustment means 15, it has become possible to control highly precisely the movement of the movable part 18 with good responsivity, and it has become easy to adjust a slit gap in order to uniform the thickness of the coating film.

Secondary, because the displacement sensor 31 of the nozzle 100 according to the present invention is provided at a position parallel to the movable part 18, and the zero point adjustment means is provided onto the slit gap adjustment means fixed position 16, it has become possible to install the displacement sensor 31 easily and with high precision.

As described above, by using the stripe coating applicator of the present invention, and by adjusting a slit gap for each stripe, it has become possible to apply a highly uniform stripe coating over the entire coating width direction.

By providing a stripe control member of a proper thickness, a stripe coating film is formed without sagging and with a stable width.

Furthermore, by providing displacement sensors in the vicinity of respective movable parts and by applying a feedback, it has become easy to adjust a slit gap and it has become possible to make the film thickness even.

As a result, yields of products requiring a stripe coating can be improved greatly and the quality of the products is improved remarkably.

What is claimed is:

1. A stripe coating applicator for coating at least two stripes comprising;

a plurality of slit outlets provided at a nozzle edge;

a pair of block edges forming said slit outlets;

stripe partitions defining each of the plurality of said slit outlets;

notches formed on at least one of said block edges toward a direction of coating fluid to be discharged, said notches corresponding to positions of said stripe partitions;

movable parts formed, at said at least one of said block edges where said notches are provided, said movable parts being formed by said notches and thin parts; and slit gap adjustment means for adjusting slit gaps by moving said movable parts.

2. A stripe coating applicator according to claim 1, wherein a width of said notches is 0.01 mm or more, and is less than a width of a stripe-uncoated portion, and a length of said notches is the length from the thin parts forming said movable parts to said slit outlets.

3. A stripe coating applicator according to claim 1, wherein said stripe partitions have a structure including an elastic body.

4. A stripe coating applicator according to claim 1, wherein a width of said stripe partitions corresponds to a width of a stripe-uncoated portion, and a length of said stripe partitions is a length from a slit inlet to a slit outlet.

5. A stripe coating applicator for coating at least two stripes, comprising a nozzle having a plurality of slit outlets and stripe partitions partitioning said plurality of slit outlets, wherein a stripe control member with a width corresponding to a width of stripe-uncoated portion, is provided on each of the front surface of said stripe partitions at said slit outlets, and $L-0.2 \text{ mm} \leq t \leq L$ is satisfied for t being the thickness of said stripe control member and L being the distance from said slit outlet to a base.

6. A stripe coating applicator according to claim 5, wherein said stripe control member has a shape to cover a lip edge of said nozzle.

7. A stripe coating applicator according to claim 5, wherein said stripe control member is a board adhering closely to lip surface of said nozzle and has an elasticity.

8. A stripe coating applicator according to claim 5, wherein said stripe control member is a trapezoid in the cross sectional shape in a direction of the slit with a longer side on the side of the lip surface and a shorter side on the side of the base on the basis of the direction of the coating fluid being discharged.

9. A stripe coating applicator for coating at least two stripes, comprising a nozzle having slit gap adjustment means, for adjusting slit gaps by moving movable parts formed at either edge of an upper and lower pair of blocks forming slit outlets, the movable parts being moved by thin parts, wherein;

displacement sensors measure displacement of said movable parts; and said slit gap adjustments means performs a feedback control based on numeric values outputted from said displacement senors.

10. A stripe coating applicator according to claim 9, wherein an angle $\alpha$ is substantially 90 degrees, said angle $\alpha$ being formed between a surface of said movable part the surface of which is in contact with said slit gap adjustment means and a surface of said block for fixing slit gap adjustment means fixed parts where said slit gap adjustment means are fixed.

11. A stripe coating applicator according to claim 9, wherein a zero point adjustment means fixed part is provided on each of the slit gap adjustment means fixed parts for fixing one of said slit gap adjustment means, a displacement sensor movable part is attached movably to each of the zero point adjustment means fixed parts, and each of said displacement sensors is attached to corresponding one of said displacement sensor movable parts;

each of said displacement sensor movable parts is movable by a zero point adjustment means; and a gap between each pair of said displacement sensors and said movable parts is initialized by corresponding one of said zero point adjustment means.

* * * * *